US011615305B2

(12) United States Patent
Deng et al.

(10) Patent No.: US 11,615,305 B2
(45) Date of Patent: Mar. 28, 2023

(54) SYSTEM AND METHOD FOR MACHINE LEARNING ARCHITECTURE WITH VARIATIONAL HYPER-RNN

(71) Applicant: ROYAL BANK OF CANADA, Toronto (CA)

(72) Inventors: Ruizhi Deng, Vancouver (CA); Yanshuai Cao, Montreal (CA); Bo Chang, Toronto (CA); Marcus Brubaker, Montreal (CA)

(73) Assignee: ROYAL BANK OF CANADA, Montreal (CA)

( * ) Notice: Subject to any disclaimer, the term of this patent is extended or adjusted under 35 U.S.C. 154(b) by 211 days.

(21) Appl. No.: 16/881,768

(22) Filed: May 22, 2020

(65) Prior Publication Data
US 2020/0372352 A1 Nov. 26, 2020

Related U.S. Application Data

(60) Provisional application No. 62/851,407, filed on May 22, 2019.

(51) Int. Cl.
*G06N 3/08* (2006.01)
*G06N 3/04* (2006.01)
(52) U.S. Cl.
CPC .............. *G06N 3/08* (2013.01); *G06N 3/04* (2013.01); *G06N 3/0445* (2013.01)
(58) Field of Classification Search
CPC .................................. G06N 3/08; G06N 3/04
See application file for complete search history.

(56) References Cited

U.S. PATENT DOCUMENTS 9,489,497 B2 * 11/2016 MaGill ............... H04L 63/1433
2017/0008162 A1 * 1/2017 Tsubota ............... H04L 12/282
(Continued)

OTHER PUBLICATIONS

N. Boulanger-Lewandowski et al.; Modeling Temporal Dependencies in High-Dimensional Sequences: Application to Polyphonic Music Generation and Transcription, arXiv preprint arXiv: 1206. 6392, 2012.
(Continued)

*Primary Examiner* — Getente A Yimer
(74) *Attorney, Agent, or Firm* — Norton Rose Fulbright Canada LLP

(57) ABSTRACT

A variational hyper recurrent neural network (VHRNN) can be trained by, for each step in sequential training data: determining a prior probability distribution for a latent variable from a prior network of the VHRNN using an initial hidden state; determining a hidden state from a recurrent neural network (RNN) of the VHRNN using an observation state, the latent variable and the initial hidden state; determining an approximate posterior probability distribution for the latent variable from an encoder network of the VHRNN using the observation state and the initial hidden state; determining a generating probability distribution for the observation state from a decoder network of the VHRNN using the latent variable and the initial hidden state; and maximizing a variational lower bound of a marginal log-likelihood of the training data. The trained VHRNN can be used to generate sequential data.

18 Claims, 21 Drawing Sheets

112A      112B      112C      112D      112E

(56) References Cited

U.S. PATENT DOCUMENTS

2019/0318256 A1* 10/2019 Wei .................. G06F 16/313
2019/0318421 A1* 10/2019 Lyonnet ............. G06N 20/20

OTHER PUBLICATIONS

S. R. Bowman et al.; Generating Sentences from a Continuous Space, arXiv:1511.06349, 2015.

Y. Burda et al.; Importance Weighted Autoencoders, arXiv: 1509.00519v4 [cs.LG] Nov. 7, 2016.

J. Chung et al.; A Recurrent Latent Variable Model for Sequential Data, In Advances in Neural Information Processing Systems, pp. 2980-2988, 2015.

A. Doucet et al.; A Tutorial on Particle Filtering and Smoothing: Fifteen years later, Handbook of Nonlinear Filtering, 12 (656-704):3, 2009.

M. Fraccaro et al.; Sequential Neural Models with Stochastic Layers, In Advances in Neural Information Processing Systems, pp. 2199-2207, 2016.

A. Graves et al.; Speech Recognition with Deep Recurrent Neural Networks, In 2013 IEEE International Conference on Acoustics, Speech and Signal Processing, pp. 6645-6649. IEEE, 2013.

D. Ha et al.; Hypernetworks, arXiv preprint arXiv: 1609.09106, 2016.

J. He et al.; Lagging Inference and Posterior Collapse in Variational Autoencoders, arXiv preprint arXiv: 1901.05534, 2019.

R. Huerta et al.; Online Decorrelation of Humidity and Temperature in Chemical Sensors for Continuous Monitoring, Chemometrics and Intelligent Laboratory Systems, 157:169-176, 2016.

I. Higgins et al.; Beta-Vae: Learning Basic Visual Concepts with a Constrained Variational Framework, In International Conference on Learning Representations, vol. 3, 2017.

S. Hochreiter et al.; Long Short-Term Memory, Neural Computation, 9(8):1735-1780, 1997.

D. P. Kingma et al.; Auto-Encoding Variational Bayes, arXiv preprint arXiv:1312.6114, 2013.

D. P. Kingma et al.; Improved Variational Inference with Inverse Autoregressive Flow, In Advances in Neural Information Processing Systems, pp. 4743-4751, 2016.

D. Krueger et al.; Bayesian Hypernetworks, arXiv preprint arXiv: 1710.04759, 2017.

R. Luo et al.; A Neural Stochastic Volatility Model, In Thirty-Second AAAI Conference on Artificial Intelligence, 2018.

C. J. Maddison et al.; Filtering Variational Objectives, In Advances in Neural Information Processing Systems, pp. 6573-6583, 2017.

D. Rezende et al.; Variational Inference with Normalizing Flows, In International Conference on Machine Learning, pp. 1530-1538, 2015.

* cited by examiner

| Model | Z dim. | Param. | Test | NOISELESS | SWITCH | LONG | ZERO-SHOT | ADD | RAND |
|---|---|---|---|---|---|---|---|---|---|
| VRNN | 8 | 2612 | −5.43 | −2.50 | −334173 | −1033348 | −3.64 | −3.57 | −5.02 |
| VRNN | 6 | 1516 | −5.80 | −3.66 | −19735 | −27200 | −4.39 | −5.09 | −5.24 |
| VRNN | 4 | 716 | −7.88 | −5.25 | −7.85 | −5777 | −5.35 | −8.67 | −6.81 |
| VHRNN | 4 | 1568 | −4.68 | −2.08 | −4.27 | −3805 | −2.57 | −2.62 | −3.91 |

FIVO estimated log likelihood per time step

FIG. 5

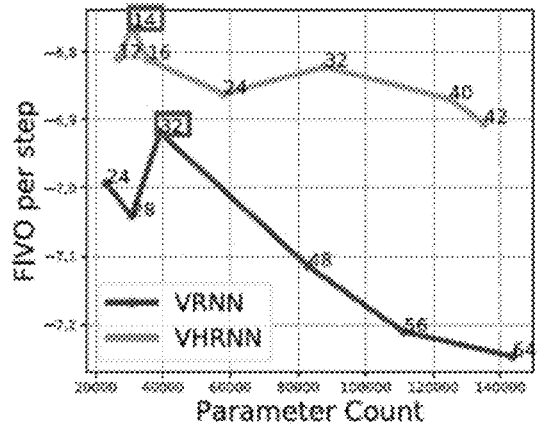 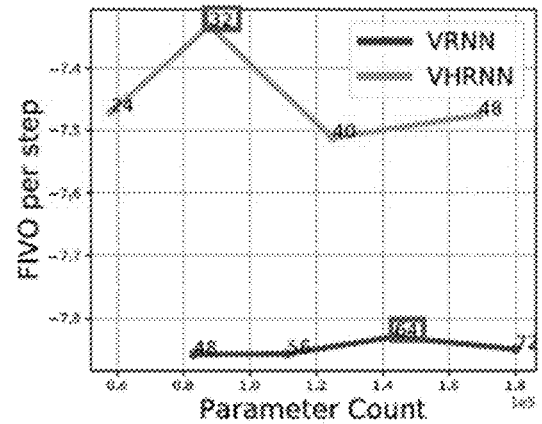
FIG. 12A  FIG. 12B
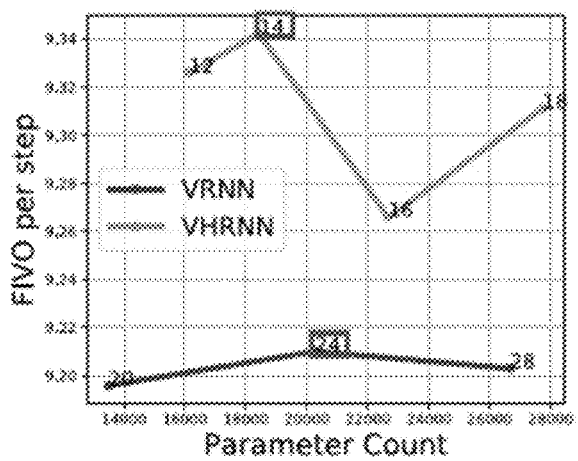 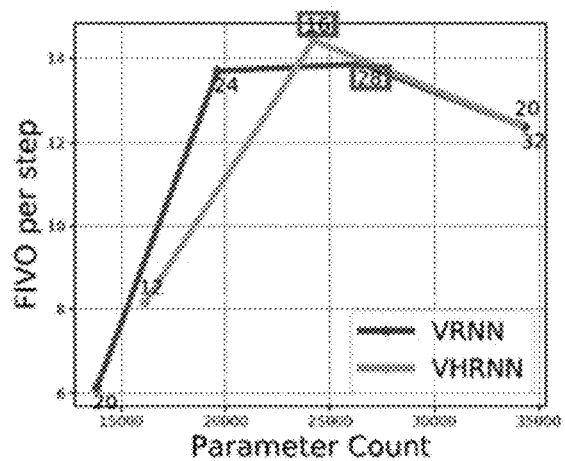
FIG. 12C  FIG. 12D

| Dataset | Z dim. | Hidden Unit | Param. | FIVO |
|---|---|---|---|---|
| JSB | 64 | 64 | 144k | −7.25 |
| | 56 | 56 | 111k | −7.21 |
| | 48 | 48 | 83k | −7.12 |
| | 32 | 32 | 39k | −6.92 |
| | 28 | 28 | 31k | −6.99 |
| | 24 | 24 | 23k | −7.04 |
| Piano | 80 | 80 | 220k | −7.85 |
| | 72 | 72 | 180k | −7.85 |
| | 64 | 64 | 144k | −7.83 |
| | 56 | 56 | 111k | −7.86 |
| | 48 | 48 | 83k | −7.86 |
| Stock | 20 | 20 | 13k | 9.20 |
| | 24 | 24 | 20k | 9.21 |
| | 28 | 28 | 27k | 9.20 |
| HT Sensor | 20 | 20 | 14k | 6.13 |
| | 24 | 24 | 20k | 13.70 |
| | 28 | 28 | 26k | 12.37 |
| | 32 | 32 | 34k | 12.69 |

| Dataset | Z dim. | Hidden Unit | Param. | FIVO |
|---|---|---|---|---|
| JSB | 42 | 84 | 135k | −6.90 |
| | 40 | 80 | 125k | −6.87 |
| | 32 | 64 | 88k | −6.82 |
| | 24 | 48 | 58k | −6.86 |
| | 16 | 32 | 35k | −6.81 |
| | 14 | 28 | 31k | −6.76 |
| | 12 | 24 | 27k | −6.80 |
| Piano | 48 | 96 | 169k | −7.48 |
| | 40 | 80 | 125k | −7.51 |
| | 32 | 64 | 88k | −7.33 |
| | 24 | 48 | 58k | −7.47 |
| Stock | 12 | 24 | 16k | 9.33 |
| | 14 | 28 | 18k | 9.34 |
| | 16 | 32 | 23k | 9.27 |
| | 18 | 36 | 28k | 9.31 |
| HT Sensor | 12 | 24 | 16k | 8.16 |
| | 16 | 32 | 24k | 14.41 |
| | 20 | 40 | 34k | 12.45 |

FIG. 15

| Dataset | Hidden Units | Gauss. Components | Param. | Log Likelihood |
|---|---|---|---|---|
| JSB | 24 | N.A. | 9k | −9.15 |
| | 28 | N.A. | 11k | −8.91 |
| | 32 | N.A. | 14k | −8.87 |
| | 48 | N.A. | 30k | −8.94 |
| | 64 | N.A. | 49k | −8.85 |
| | 80 | N.A. | 75k | −8.77 |
| | 84 | N.A. | 83k | −8.77 |
| | 96 | N.A. | 106k | −8.74 |
| | 104 | N.A. | 124k | −8.85 |
| | 112 | N.A. | 143k | −8.67 |
| Stock | 24 | 3 | 7k | 8.28 |
| | 28 | 3 | 9k | 8.33 |
| | 32 | 3 | 12k | 8.42 |
| | 36 | 3 | 15k | 8.35 |
| | 40 | 3 | 18k | 8.29 |
| | 48 | 3 | 26k | 7.91 |
| | 24 | 5 | 7k | 8.61 |
| | 28 | 5 | 9k | 8.44 |
| | 32 | 5 | 12k | 8.44 |
| | 36 | 5 | 15k | 8.47 |
| | 40 | 5 | 19k | 8.42 |
| | 48 | 5 | 26k | 8.58 |

FIG. 18

| Model | Z dim. | Hidden dim. | Hyper size | Param. | FIVO |
|---|---|---|---|---|---|
| VRNN | 24 | 24 | - | 23k | −7.04 |
|  | 28 | 28 | - | 31k | −6.99 |
|  | 32 | 32 | - | 39k | −6.91 |
| VHRNN | 24 | 12 | 16 | 24k | −6.92 |
|  | 28 | 14 | 18 | 31k | −6.73 |
|  | 32 | 16 | 20 | 39k | −6.70 |

FIG. 19

| Dataset | Z dim. | Hyper Input | FIVO |
|---|---|---|---|
| JSB | 14 | latent only | −6.68 |
|  | 14 | hidden only | −6.71 |
|  | 14 | latent+hidden | −6.76 |
|  | 32 | latent only | −6.76 |
|  | 32 | hidden only | −7.03 |
|  | 32 | latent+hidden | −6.82 |
| Synthetic Test | 4 | latent only | −5.01 |
|  | 4 | hidden only | −4.79 |
|  | 4 | latent+hidden | −4.68 |

FIG. 20

| Dataset | Z dim. | VHRNN-MLP Param. | VHRNN-RNN Param. | VHRNN-MLP FIVO | VHRNN-RNN FIVO |
|---|---|---|---|---|---|
| JSB | 42 | 146k | 135k | | -6.90 |
| | 40 | 135k | 125k | | -6.87 |
| | 32 | 94k | 88k | -7.02 | -6.82 |
| | 24 | 62k | 58k | -7.08 | -6.86 |
| | 16 | 37k | 35k | -7.13 | -6.81 |
| | 14 | 32k | 31k | -6.83 | -6.76 |
| | 12 | 28k | 27k | -6.76 | -6.80 |
| | | | | -6.73 | |
| | | | | -6.83 | |
| Stock | 12 | 16k | 16k | 9.47 | 9.33 |
| | 14 | 19k | 18k | 9.21 | 9.34 |
| | 16 | 24k | 23k | 9.31 | 9.27 |
| | 18 | 29k | 28k | 9.19 | 9.31 |
| Syn-Test | 4 | 1676 | 1568 | -5.13 | -4.68 |

FIG. 21

| | | | Test | FIVO estimated log likelihood per time step | | | | | |
|---|---|---|---|---|---|---|---|---|---|
| Model | Z dim. | Param. | Test | NOISELESS | SWITCH | RAND | LONG | ZERO-SHOT | ADD |
| VHRNN-MLP | 4 | 1676 | -5.13 | -2.73 | -5.22 | -4.12 | -0.04937 | -2.94 | -3.84 |
| VHRNN-RNN | 4 | 1568 | -4.68 | -2.08 | -4.37 | -3.91 | -3005 | -2.57 | -2.62 |

FIG. 22

SYSTEM AND METHOD FOR MACHINE LEARNING ARCHITECTURE WITH VARIATIONAL HYPER-RNN

CROSS-REFERENCE TO RELATED APPLICATION(S)

This application claims priority from US Provisional Patent Application No. 62/851,407 filed on May 22, 2019, the entire contents of which are hereby incorporated by reference herein.

FIELD

This relates to sequence modelling, in particular, sequence modelling with neural network architecture.

BACKGROUND

Traditional neural network architecture, such as recurrent neural networks (RNNs) have historically been applied to domains such as natural language processing and speech processing. Traditional RNN architecture, however, is not ideal to capture the high variability of other domains, such as financial time series data, due to inherent variability of the data, noise, or the like.

SUMMARY

According to an aspect, there is provided a computer-implemented method for training a variational hyper recurrent neural network (VHRNN), the method comprising: for each step in sequential training data: determining a prior probability distribution for a latent variable, given previous observations and previous latent variables, from a prior network of the VHRNN using an initial hidden state; determining a hidden state from a recurrent neural network (RNN) of the VHRNN using an observation state, the latent variable and the initial hidden state; determining an approximate posterior probability distribution for the latent variable, given the observation state, previous observations and previous latent variables, from an encoder network of the VHRNN using the observation state and the initial hidden state; determining a generating probability distribution for the observation state, given the latent variable, the previous observations and the previous latent variables, from a decoder network of the VHRNN using the latent variable and the initial hidden state; and maximizing a variational lower bound of a marginal log-likelihood of the training data to train the VHRNN; and storing the trained VHRNN in a memory.

In some embodiments, the variational lower bound includes at least one of an evidence lower bound (ELBO), importance weight autoencoders (IWAE), or filtering variational objectives (FIVO).

In some embodiments, the prior probability distribution, defined as $p(z_t|x_{<t}, z_{<t})$, for the latent variable, defined as $z_t$, is based on:

$$z_t|x_{<t}, z_{<t} \sim \mathcal{N}(\mu_t^{prior}, \Sigma_t^{prior})$$

where $(\mu_t^{prior}, \Sigma_t^{prior})$ is the prior network, $x_t$ is the observation state, and t is a current step of the steps in the sequential training data.

In some embodiments, the RNN, defined as g, is based on:

$$h_t = g_{\theta(z_t, h_{t-1})}(x_t, z_t, h_{t-1})$$

where $\theta(z_t, h_{t-1})$ is a hypernetwork of the VHRNN that generates parameters of the RNN g using the latent variable, defined as $z_t$, and the initial hidden state, defined as $h_{t-1}$, $x_t$ is the observation state, and t is a current step of the steps in the sequential training data.

In some embodiments, the hypernetwork $\theta(z_t, h_{t-1})$ is implemented as a recurrent neural network (RNN).

In some embodiments, the hypernetwork $\theta(z_t, h_{t-1})$ is implemented as a long short-term memory (LSTM).

In some embodiments, the hypernetwork $\theta(z_t, h_{t-1})$ generates scaling vectors for input weights and recurrent weights of the RNN.

In some embodiments, the generating probability distribution, defined as $p(x_t|z_{\leq t}, x_{<t})$, for the observation state, defined as $x_t$, is based on:

$$x_t|z_{\leq t}, x_{<t} \sim \mathcal{N}(\mu_t^{dec}, \Sigma_t^{dec})$$

where $(\mu_t^{dec}, \Sigma_t^{dec}) = \phi_{\omega(z_t, h_{t-1})}(z_t, h_{t-1})$ is another hypernetwork of the VHRNN that generates parameters of the decoder network, defined as $\phi^{dec}$, using the latent variable, defined as $z_t$, and the initial hidden state, defined as $h_{t-1}$, and t is a current step of the steps in the sequential training data.

In some embodiments, the hypernetwork $\omega(z_t, h_{t-1})$ is implemented as a multilayer perceptron (MLP).

According to another aspect, there is provided a computer-implemented method for generating sequential data using a variational hyper recurrent neural network (VHRNN) trained using a method as described herein, the method comprising: for each step in the sequential data: determining a prior probability distribution for a latent variable $z_t$, given previous observations and previous latent variables, from the prior network of the VHRNN using an initial hidden state; determining a hidden state from the recurrent neural network (RNN) of the VHRNN using an observation state, the latent variable and the initial hidden state; determining a generating probability distribution for the observation state given the latent variable, the previous observations and the previous latent variables, from the decoder network of the VHRNN using the latent variable and the initial hidden state; and sampling a generated observation state from the generating probability distribution.

In some embodiments, the prior probability distribution, defined as $p(z_t|x_{<t}, z_{<t})$, for the latent variable $z_t$ is based on:

$$z_t|x_{<t}, z_{<t} \sim \mathcal{N}(\mu_t^{prior}, \Sigma_t^{prior})$$

where $(\mu_t^{prior}, \Sigma_t^{prior})$ is the prior network, $x_t$ is the observation state, and t is a current step of the steps in the sequential data.

In some embodiments, the RNN, defined as g, is based on:

$$h_t = g_{\theta(z_t, h_{t-1})}(x_t, z_t, h_{t-1})$$

where $\theta(z_t, h_{t-1})$ is a hypernetwork of the VHRNN that generates parameters of the RNN g using the latent variable, defined as $z_t$, and the initial hidden state, defined as $h_{t-1}$, $x_t$ is the observation state, and t is a current step of the steps in the sequential data.

In some embodiments, the hypernetwork $\theta(z_t, h_{t-1})$ is implemented as a recurrent neural network (RNN).

In some embodiments, the hypernetwork $\theta(z_t, h_{t-1})$ is implemented as a long short-term memory (LSTM).

In some embodiments, the hypernetwork $\theta(z_t, h_{t-1})$ generates scaling vectors for input weights and recurrent weights of the RNN g.

In some embodiments, the generating probability distribution, defined as $p(x_t|z_{\leq t}, x_{<t})$, for the observation state, defined as $x_t$, is based on:

$$x_t|z_{\leq t}, x_{<t} \sim \mathcal{N}(\mu_t^{dec}, \Sigma_t^{dec})$$

where $(\mu_t^{dec}, \Sigma_t^{dec}) = \phi_{\omega(z_t, h_{t-1})}(z_t, h_{t-1})$, and $\omega(z_t, h_{t-1})$ is another hypernetwork of the VHRNN that generates parameters of the decoder network, defined as $\phi^{dec}$, using the latent variable, defined as $z_t$, and the initial hidden state, defined as $h_{t-1}$, and t is a current step of the steps in the sequential data.

In some embodiments, the hypernetwork $\omega(z_t, h_{t-1})$ is implemented as a multilayer perceptron (MLP).

In some embodiments, the method further comprises forecasting future observations of the sequential data based on the sampled generated observation states.

In some embodiments, the sequential data is time-series financial data.

According to a further aspect, the is provided a non-transitory computer readable medium comprising a computer readable memory storing thereon a variational hyper recurrent neural network trained using a method as described herein, the variational hyper recurrent neural network executable by a computer to perform a method to generate sequential data, the method comprising: for each step in the sequential data: determining a prior probability distribution for a latent variable $z_t$, given previous observations and previous latent variables, from the prior network of the VHRNN using an initial hidden state; determining a hidden state from the recurrent neural network (RNN) of the VHRNN using an observation state, the latent variable and the initial hidden state; determining a generating probability distribution for the observation state given the latent variable, the previous observations and the previous latent variables, from the decoder network of the VHRNN using the latent variable and the initial hidden state; and sampling a generated observation state from the generating probability distribution.

Other features will become apparent from the drawings in conjunction with the following description.

BRIEF DESCRIPTION OF DRAWINGS

In the figures which illustrate example embodiments,

FIG. 5 is a table illustrating evaluation results of example baseline variational recurrent neural networks (VRNNs) and an example VHRNN model on synthetic datasets, according to an embodiment;

FIGS. 12A-12D illustrate comparisons of parameter count and performance of example baseline VRNNs and example VHRNN models on real-world datasets, according to embodiments;

FIG. 15 illustrates the performance of example baseline VRNNs (top table) and example VHRNN models (bottom) on real-world datasets, according to an embodiment;

FIG. 18 illustrates experimental results of example HyperLSTM models on real-world datasets, according to an embodiment;

FIG. 19 is a table illustrating evaluation results of example baseline VRNNs and example VHRNN models with the same latent dimensions, according to an embodiment;

FIG. 20 is a table illustrating evaluation results of example VHRNN models with different hyper network inputs, according to an embodiment;

FIG. 21 illustrates a parameter-performance comparison of example VHRNN models with an RNN as a hyper network and example VHRNN models with a three-layer feed-forward network on real-world datasets, according to an embodiment; and FIG. 22 illustrates results of a systematic generalization study on example VHRNN models with an RNN as a hyper network and example VHRNN models with a three-layer feed-forward network on synthetic data, according to an embodiment.

DETAILED DESCRIPTION

Figure 1:
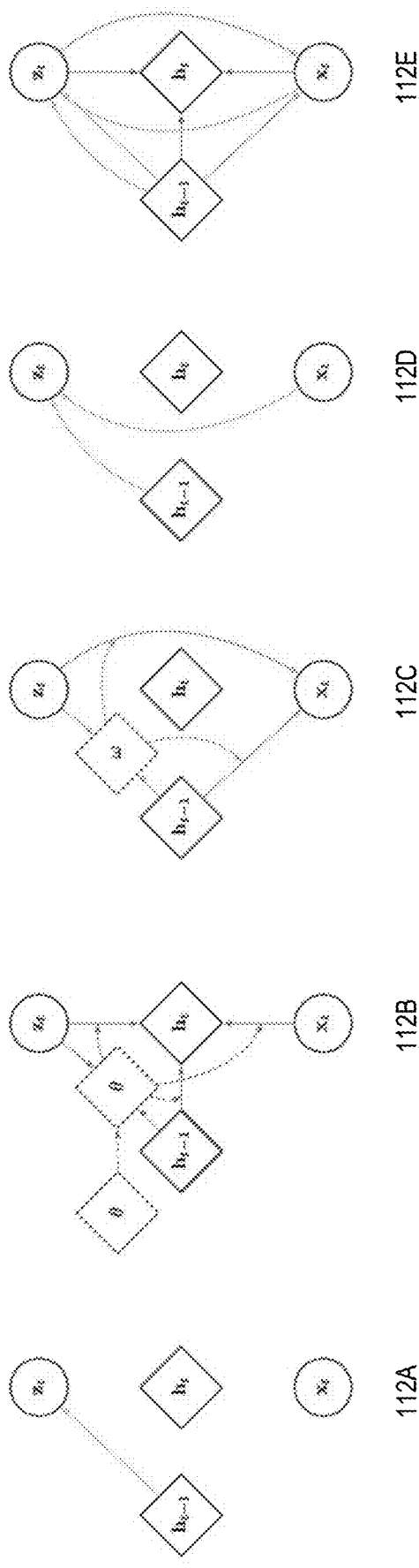
FIG. 1 is a schematic diagram of operations of a variational hyper recurrent neural network (VHRNN) model, according to an embodiment.

Systems and methods disclosed herein provide a probabilistic sequence model that captures high variability in sequential or time series data, both across sequences and within an individual sequence. In some embodiments, systems and methods described herein for machine learning architecture with variational hyper recurrent neural networks use temporal latent variables to capture information about the underlying data pattern, and dynamically decode the latent information into modifications of weights of the base decoder and recurrent model. The efficacy of embodiments of the concepts described herein is demonstrated on a range of synthetic and real world sequential data that exhibit large scale variations, regime shifts, and complex dynamics.

Recurrent neural networks (RNNs) can be used as architecture for modelling sequential data as RNNs can handle variable length input and output sequences. Initially invented in context of natural language processing [Hochreiter and Schmidhuber, 1997], long short-term memory (LSTM), gated recurrent unit (GRU) as well as later attention-augmented versions have found wide-spread successes, for example, in language modeling, machine translation, speech recognition and recommendation systems. However, RNNs use deterministic hidden states to process input sequences and model the system dynamics using a set of time-invariant weights, and they do not necessarily have the right inductive bias for time series data outside the originally intended domains.

Many natural systems have complex feedback mechanisms and numerous exogenous sources of variabilities. Observations from such systems would contain large variations both across sequences in a dataset as well as within any single sequence; the dynamics could be switching regimes drastically, and the noise process could also be heteroskedastic. To capture all these intricate patterns in RNN with deterministic hidden states and a fixed set of weights requires learning about the patterns, the subtle deviations from the patterns, the conditions under which regime transitions occur which is not always predictable. Outside of the deep learning literature, many time series models have been proposed to capture specific types of high variabilities. For instance, switching linear dynamical models aim to model complex dynamical systems with a set of simpler linear patterns. Conditional volatility models are introduced to model time series with heteroscedastic noise process whose noise level itself is a part of the dynamics. However, these models usually encode specific inductive biases in a hard way, and cannot learn different behaviors and interpolate among the learned behaviors as deep neural nets.

Variational autoencoder (VAE) is an unsupervised approach to learning a compact representation from data [Kingma and Welling, 2013]. VAE uses a variational distribution $q(z|x)$ to approximate the intractable posterior distribution of the latent variable z. With the use of variational approximation, VAE optimizes, or maximizes, the evidence lower bound (ELBO) of the marginal log-likelihood of data:

$$\mathcal{L}_{(x)} = \mathbb{E}_{q(z|x)}[\log p(x|z)] - D_{KL}(q(z|x)\|p(z)) \leq \log p(x)$$

where $p(z)$ is a prior distribution of z and $D_{KL}$ denotes the Kullback-Leibler (KL) divergence. The approximate posterior $q(z|x)$ is usually formulated as a Gaussian with a diagonal covariance matrix.

Such formulation permits the use of reparameterization trick: Given $q(z|x) \sim \mathcal{N}(\mu, \Sigma)$, $p(x|z) = p(x|\mu + y \cdot \Sigma^{1/2})$. The reparameterization trick allows the model to be trained end-to-end with standard back propagation.

Variational autoencoders have demonstrated impressive performance on non-sequential data like images. Certain works [Bowman et al, 2015; Chung et al, 2015; Fraccaro et al, 2016; Luo et al, 2018] extend the domain of VAE models to sequential data.

Existing variational RNN (VRNN) [Chung et al, 2015] further incorporate a latent variable at each time step into their models. A prior distribution conditioned on the contextual information and a variational posterior is proposed at each time step to optimize a step-wise variational lower bound. Sampled latent variables from the variational posterior are decoded into the observation at the current time step.

A parallel stream of work to improve latent variable models with variational inference study tighter bounds of the data's log-probability than ELBO. Importance Weighted Autoencoder (IWAE) [Burda et al, 2016] estimates a different variational bound of the log-likelihood of data with an importance weighted average using multiple samples of z. The bound of IWAE is provably tighter than ELBO.

Filtering Variational Objective (FIVO) [Maddison et al, 2017] improves IWAE by incorporating particle filtering [Doucet and Johansen, 2009] that exploits the temporal structure of sequential data to estimate the data log-likelihood. A particle filter is a sequential Monte Carlo algorithm that propagates a population of weighted particles through all time steps using importance sampling. One distinguishing feature of FIVO is the resampling steps, which allow the model to drop low-probability samples with high-probability during training. When the effective sample size drops below a threshold, a new set of particles are sampled with replacement in proportion to their weights; the new weights are then reset to 1. Resampling prevents the relative variance of the estimates from exponentially increasing in the number of time steps.

FIVO still computes a step-wise IWAE bound based on the sampled particles at each time step, but it shows better sampling efficiency and tightness than IWAE. In some embodiments, FIVO is used as the objective to train and evaluate models disclosed herein.

Hypernetworks [Ha et al, 2016] use one network to generate the parameters or weights of another network. A dynamic version of hypernetworks can be applied to sequence data, but due to lack of latent variables, can only capture uncertainty in the output variables. For discrete sequence data such as text, categorical output variables can model multi-model outputs very well; but on continuous time series with the typical Gaussian output variables, traditional hypernetworks are much less capable at dealing with stochasticity. Furthermore, it does not allow straightforward interpretation of the model behavior using the time-series of KL divergence as disclosed herein. With the augmentation of latent variables, models disclosed herein are much more capable of modelling uncertainty.

Bayesian hypernetworks [Krueger et al, 2017] learn an approximate posterior distribution over the parameters conditioned on the entire dataset. It utilizes the normalizing flow [Rezende and Mohamed, 2015, Kingma et al, 2016] to transform random noise to network weights. Weight normalization is used to parameterize the model's weight efficiently. However, the once learned weight distribution becomes independent of the model's input. This independence could limit the model's flexibility to deal with the variance in sequential data.

Bayesian hypernetworks also have a latent variable in the context of hypernetworks. However, the goal of Bayesian Hypernetwork is an improved version of Bayesian neural net to capture model uncertainty. The work of [Krueger et al, 2017] has no recurrent structure and cannot be applied to sequential data. Furthermore, the use of normalizing flow dramatically limits the flexibility of the decoder architecture design, unlike in models as disclosed herein.

Models disclosed herein can dynamically generate non-shared weights for RNNs based on inputs. In some embodiments, matrix factorization can be used to learn a compact embedding for the weights of static convolutional networks, illustrating the better parameter performance efficiency of hypernetworks.

A system 100 for VHRNN modelling generates and implements a neural recurrent latent variable model, a variational hyper RNN (VHRNN) model 110, capable, in some embodiments, of capturing variability both cross different sequences in a dataset and within a sequence.

In some embodiments, VHRNN model 110 can naturally handle scale variations of many orders of magnitude, including behaviours of sudden exponential growth in many real world bubble situations followed by collapse. In some embodiments, VHRNN model 110 can also perform system identification and re-identification dynamically at inference time.

VHRNN model 110 makes use of factorization of sequential data and joint distribution of latent variables. In VHRNN model 110, latent variables also parameterize the weights for decoding and transition in RNN cell across time steps, giving the model more flexibility to deal with variations within and across sequences.

Conveniently, VHRNN model 110 may capture complex time series without encoding a large number of patterns in static weights, but instead only encodes base dynamics that can be selected and adapted based on run-time observations. Thus VHRNN model 110 can easily learn to express a rich set of behaviors, including but not limited to behaviours disclosed herein. VHRNN model 110 can dynamically identify the underlying patterns and make time-variant uncertainty predictions in response to various types of uncertainties caused by observation noise, lack of information, or model misspecification. As such, VHRNN model 110 can model complex patterns with fewer parameters; when given a large number of parameters, it may generalize better than previous techniques.

In some embodiments, VHRNN model 110 includes hypernetworks and is an improvement of the variational RNN (VRNN) model. VRNN models use recurrent stochastic latent variables at each time step to capture high-level information in the stochastic hidden states. The latent variables can be inferred using a variational recognition model and are fed as input into the RNN and decoding model to reconstruct observations, and an overall VRNN model can be trained to maximize the evidence lower bound (ELBO).

In some embodiments, latent variables in VHRNN model 110 are dynamically decoded to produce the RNN transition weights and observation decoding weights in the style of hypernetworks, for example, generating diagonal multiplicative factors to the base weights. As a result, VHRNN model 110 may better capture complex dependency and stochasticity across observations at different time steps.

VHRNN model 110 can sample a latent variable and dynamically generates non-shared weights at each time step, which can provide improved handling of variance of dynamics within sequences.

Conveniently, VHRNN model 110 may be better than existing techniques at capturing different types of variability and generalizing to data with unseen patterns on synthetic as well as real-world datasets.

Formulation of VHRNN model 110, according to an embodiment, will now be detailed.

A recurrent neural network (RNN) can be characterized by $h_t = g_\theta(x_t, h_{t-1})$, where $x_t$ and $h_t$ are the observation state and hidden state of the RNN at time step t, and θ is the fixed weights of the RNN model.

Hidden state $h_t$ is often used to generate the output for other learning tasks, e.g., predicting the observation at the next time step.

For VHRNN model 110, an RNN or recurrence model g can be augmented with a latent random variable $z_t$, which is also used to output the non-shared parameters of RNN g at time step t.

$$h_t = g_{\theta(z_t, h_{t-1})}(x_t, z_t, h_{t-1}) \tag{1}$$

where $\theta(z_t, h_{t-1})$ is a hypernetwork that generates the parameters of RNN g at time step t.

Latent variable $z_t$ can also be used to determine the parameters of the generative model, or generating probability distribution $p(x_t|z_{\leq t}, x_{<t})$:

$$x_t|z_{\leq t}, x_{21} \sim \mathcal{N}(\mu_t^{dec}, \Sigma_t^{dec}) \tag{2}$$

where $(\mu_t^{dec}, \Sigma_t^{dec}) = \phi_{\omega(z_t, h_{t-1})}(z_t, h_{t-1})$. Previous observations and latent variables, characterized by $h_{t-1}$, can define a prior probability distribution $p(z_t|x_{<t}, z_{<t})$ over latent variable $z_t$.

$$z_t|x_{<t}, z_{<t} \sim \mathcal{N}(\mu_t^{prior}, \Sigma_t^{prior}) \tag{3}$$

where $(\mu_t^{prior}, \Sigma_t^{prior}) = \phi^{prior}(h_{t-1})$.

From equations (2) and (3), the following generation process of sequential data can be developed:

$$p(x_{\leq T}, z_{\leq T}) = \Pi_{t=1}^T p(z_t|x_{<t}, z_{<t}) p(x_t|x_{<t}, z_{\leq t}) \tag{4}$$

The true posterior distributions of $z_t$ conditioned on observations $x_{\leq t}$ and latent variables $z_{<t}$ are intractable, posing a challenge in both sampling and learning. Therefore, an approximate posterior distribution $q(z_t|x_{\leq t}, z_{<t})$ is introduced such that $$z_t|x_{\leq t}, z_{<t} \sim \mathcal{N}(\mu_t^{enc}, \Sigma_t^{enc}) \tag{5}$$

where $(\mu_t^{enc}, \Sigma_t^{enc}) = \phi^{enc}(x_t, h_{t-1})$. This approximate posterior distribution enables VHRNN model 110 to be trained by maximizing a variational lower bound, such as ELBO [Kingma and Welling, 2013], IWAE [Burda et al, 2016] or FIVO [Maddison et al, 2017].

The main components of VHRNN model 110, including g, $\phi^{dec}$, $\phi^{enc}$, $\phi^{prior}$ may be referred to as "primary networks" and the components responsible for generating parameters, θ and ω, referred to as "hypernetworks" herein.

FIG. 1 is a schematic diagram of operations 112A, 112B, 112C, 112D and 112E for each time step t of a VHRNN model 110, a neural recurrent latent variable model, performed by a system 100, according to an embodiment.

FIG. 1 illustrates, for each of operations 112A, 112B, 112C, 112D and 112E, at time t, a latent variable state $z_t$, an observation state $x_t$, a hidden state $h_t$, and previous time step hidden state $h_{t-1}$.

Operators in FIG. 1 are indicated by arrows, and dashed lines and boxes represent hypernetwork components. Operation 112A is a prior operation of VHRNN model 110 to define a prior distribution, for example, based on equation (3). Operation 112B is a recurrence operation of VHRNN model 110 to update an RNN hidden state, for example, based on equation (1). Operation 112C is a generation operation of VHRNN model 110 to define a generating distribution, for example, based on equation (2). Operation 112D is an inference operation of VHRNN model 110 to infer an approximate posterior, for example, based on equation (5). Operation 112E illustrates an overall architecture of a computational path of VHRNN model 110, omitting hypernetwork components.

For operation 112A, system 100 determines a prior probability distribution $p(z_t|x_{<t}, z_{<t})$ for latent variable $z_t$, given previous observations $x_{<t}$ and previous latent variables $z_{<t}$.

In some embodiments, the prior probability distribution is defined based on equation (3), and the parameters of the prior probability distribution are determined from a prior network $\phi^{prior}$ using an initial hidden state $h_{t-1}$. $\phi^{prior}$ is a suitable function such as a neural network.

For operation 112B, system 100 determines or updates a hidden state $h_t$. In some embodiments, the hidden state $h_t$ is defined based on equation (1), and the hidden state $h_t$ is determined from an RNN model g using an observation state $x_t$, the latent variable $z_t$ and the initial hidden state $h_{t-1}$.

The parameters of RNN g, (namely, the observation state $x_t$, the latent variable $z_t$ and the initial hidden state $h_{t-1}$) are updated by a hypernetwork $\theta(z_t, h_{t-1})$ using the latent variable $z_t$ and the initial hidden state $h_{t-1}$.

In some embodiments, hypernetwork $\theta(z_t, h_{t-1})$ is implemented as an RNN.

For operation 112C, system 100 determines a generating probability distribution $p(x_t|z_{\leq t}, x_{<t})$ for observation state $x_t$, given latent variable $z_t$, previous observations $x_{<t}$ and previous latent variables $z_{<t}$. In some embodiments, the generating distribution is defined based on equation (2), and the parameters of the generating distribution are determined from a decoder network $\phi^{dec}$ using latent variable $z_t$ and the initial hidden state $h_{t-1}$.

The parameters of decoder network $\phi^{dec}$ (namely, the latent variable $z_t$ and the initial hidden state $h_{t-1}$) are updated by another hypernetwork $\omega(z_t, h_{t-1})$.

In some embodiments, hypernetwork $\omega(z_t, h_{t-1})$ is implemented as a multilayer perceptron (MLP).

System 100 may sample an observation state $x_t$ from the generating distribution.

For operation 112D, system 100 determines an approximate posterior probability distribution $q(z_t|x_{\leq t}, z_{<t})$ for latent variable $z_t$, given observation state $x_t$, previous observations $x_{<t}$ and previous latent variables $z_{<t}$. In some embodiments, the approximate posterior probability distribution is defined based on equation (5), and the parameters of the approximate posterior probability distribution are determined from an encoder network $\phi^{enc}$ using observation state $x_t$ and the initial hidden state $h_{t-1}$.

The approximate posterior probability distribution enables VHRNN model 110 to be trained by maximizing a variational lower bound, such as evidence lower bound (ELBO) [Kingma and Welling, 2013], importance weight autoencoders (IWAE) [Burda et al, 2016] and filtering variational objectives (FIVO) [Maddison et al, 2017].

Operation 112E illustrates an overall computational path of VHRNN model 110.

In some implementations, using a VAE approach, covariance matrices $\Sigma_t^{prior}$, $\Sigma_t^{dec}$ and $\Sigma_t^{enc}$ can be parameterized as diagonal matrices.

In some embodiments, $\Sigma_t^{prior}$ in VHRNN model 110 is not an identity matrix as in a vanilla VAE; it is the output of $\phi^{prior}$ and depends on the hidden state $h_{t-1}$ at the previous time step.

In some embodiments, recurrence model g in equation (1) is implemented as an RNN cell, which takes as input $x_t$ and $z_t$ at each time step t and updates the hidden states $h_{t-1}$.

The parameters of g are generated by the hyper network $\theta(z_t, h_{t-1})$, as illustrated in operation 112B of FIG. 1.

In some embodiments, $\theta$ is implemented using an RNN to capture the history of data dynamics, with $z_t$ and $h_{t-1}$ as input at each time step t. However, it can be computationally costly to generate all the parameters of g using $\theta(z_t, h_{t-1})$. Thus, in some embodiments, hypernetwork $\theta$ maps $z_t$ and $h_{t-1}$ to bias and scaling vectors.

In some embodiments, scaling vectors modify the parameters of g by scaling each row of the weight matrices, routing information in the input and hidden state vectors through different channels.

Figure 2:
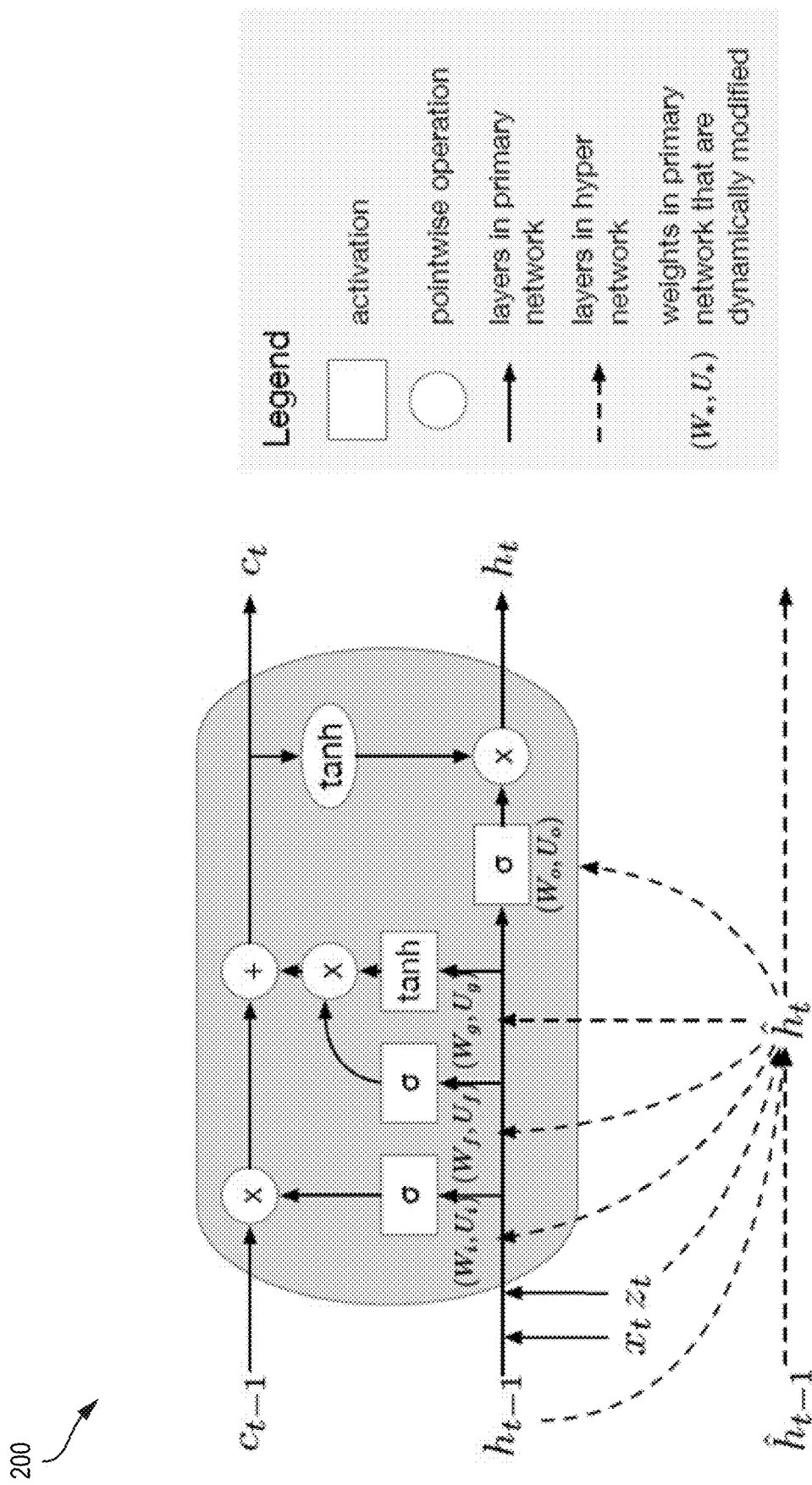
FIG. 2 is a schematic diagram of an implementation of a recurrence model of a VHRNN using a long short-term memory (LSTM) cell, according to an embodiment.

In some embodiments, recurrence model g may be implemented using an RNN cell 200 with LSTM-style update rules and gates, as illustrated in FIG. 2.

Let $* \in \{i, f, g, o\}$ denote the one of the four LSTM-style gates in g. $W_*$ and $U_*$ denote the input and recurrent weights of each gate in LSTM cell respectively. The hyper network $\theta(z_t, h_{t-1})$ outputs $d_{i*}$ and $d_{h*}$ that are the scaling vectors for the input weights $W_*$ and recurrent weights $U_*$ of the recurrent model g in equation (1).

The overall implementation of g in equation (1) can be described, in an embodiment, as follows:

$i_t = \sigma(d_{ii}(z_t,h_{t-1}) \circ (W_i y_t) + d_{hi}(z_t,h_{t-1}) \circ (U_i h_{t-1}))$, $f_t = \sigma(d_{if}(z_t,h_{t-1}) \circ (W_f y_t) + d_{hf}(z_t,h_{t-1}) \circ (U_f h_{t-1}))$, $g_t = \tan h(d_{ig}(z_t,h_{t-1}) \circ (W_g y_t) + d_{hg}(z_t,h_{t-1}) \circ (U_g h_{t-1}))$, $o_t = \sigma(d_{io}(z_t,h_{t-1}) \circ (W_o y_t) + d_{ho}(z_t,h_{t-1}) \circ (U_o h_{t-1}))$ $c_t = f_t \circ c_{t-1} + i_t \circ g_t$, $h_t = o_t \circ \tan h(c_t)$, where $\circ$ denotes the Hadamard product and $y_t$ is a fusion (e.g., concatenation) of observation $x_t$ and latent variable $z_t$. For simplicity of notation, bias terms are omitted from the above equations.

Another hypernetwork $\omega(z_t, h_{t-1})$ generates the parameters of the generative model in equation (2). In some embodiments, hypernetwork $\omega(z_t, h_{t-1})$ is implemented as a multilayer perceptron (MLP). Similar to $\theta(z_t, h_{t-1})$, the outputs can be the bias and scaling vectors that modify the parameters of the decoder $\phi_{\omega(z_t,h_{t-1})}$.

Figure 3A:
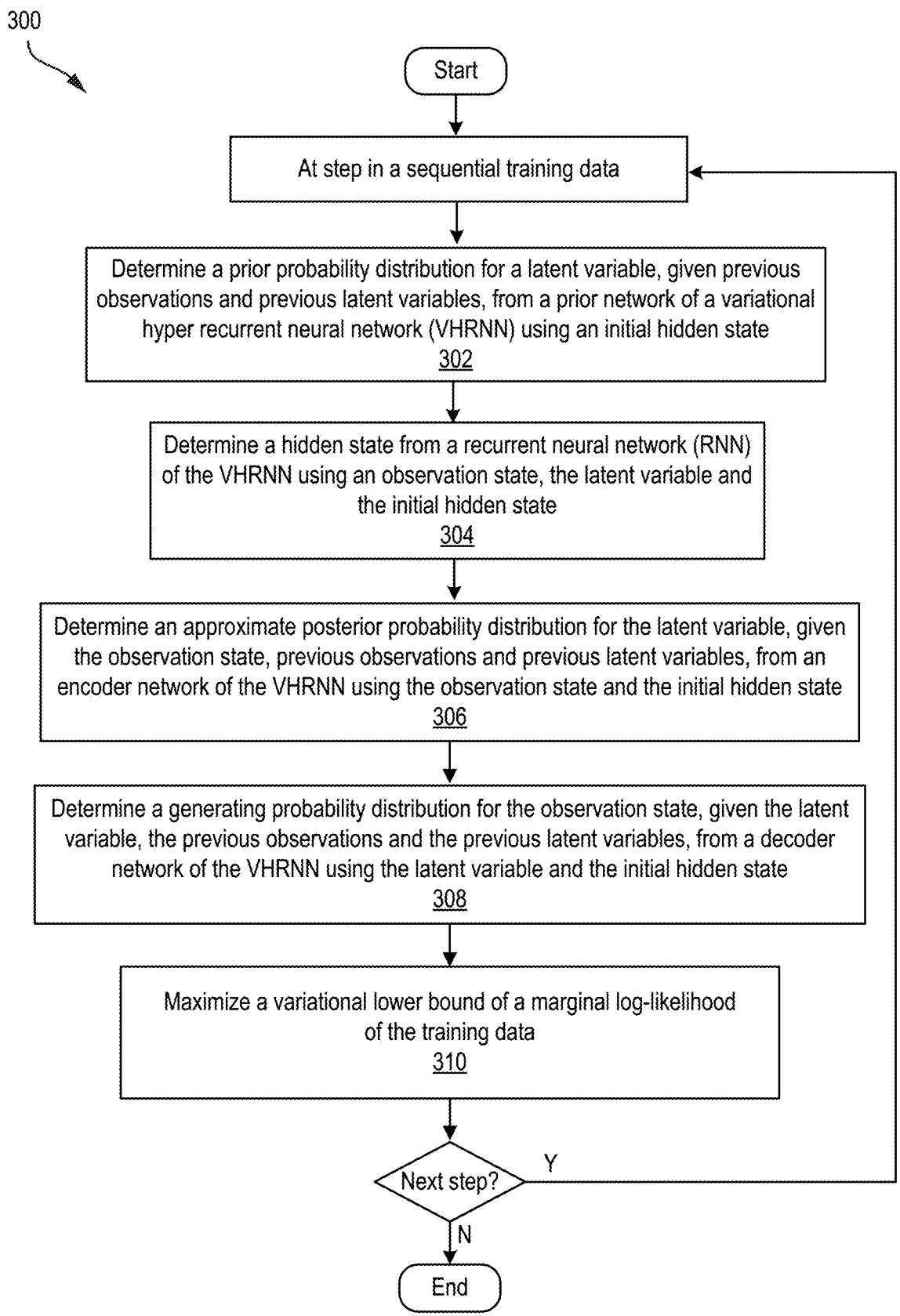
FIG. 3A is a flow chart of a method for training a VHRNN, according to an embodiment.

FIG. 3A is a flow chart of a method 300 for training a VHRNN such as VHRNN model 110, according to an embodiment. The steps are provided for illustrative purposes. Variations of the steps, omission or substitution of various steps, or additional steps may be considered.

Blocks 302 to 310 are performed for each step or time step t from 1 to T in sequential training data, such as time series data, $x = (x_1, x_2, \ldots, x_T)$.

At block 302, a prior probability distribution $p(z_t|x_{<t}, z_{<t})$ is determined for a latent variable $z_t$, given previous observations $x_{<t}$ and previous latent variables $z_{<t}$, from a prior network $\phi^{prior}$ of the VHRNN using an initial hidden state $h_{t-1}$.

In some embodiments, the prior probability distribution $p(z_t|x_{<t}, z_{<t})$ for the latent variable $z_t$ is based on equation (3):

$$z_t|x_{<t}, z_{<t} \sim \mathcal{N}(\mu_t^{prior}, \Sigma_t^{prior})$$

where $(\mu_t^{prior}, \Sigma_t^{prior})$ is the prior network $\phi^{prior}$.

At block 304, a hidden state $h_t$ is determined from a recurrent neural network (RNN) g of the VHRNN using an observation state $x_t$, the latent variable $z_t$ and the initial hidden state $h_{t-1}$.

In some embodiments, the RNN g is based on equation (1):

$$h_t = g_{\theta(z_t,h_{t-1})}(x_t, z_t, h_{t-1})$$

where $\theta(z_t, h_{t-1})$ is a hypernetwork of the VHRNN that generates parameters of RNN g using the latent variable $z_t$ and the initial hidden state $h_{t-1}$.

In some embodiments, the hypernetwork $\theta(z_t, h_{t-1})$ is implemented as a recurrent neural network (RNN).

In some embodiments, the hypernetwork $\theta(z_t, h_{t-1})$ is implemented as a long short-term memory (LSTM).

In some embodiments, the hypernetwork $\theta(z_t, h_{t-1})$ generates scaling vectors for input weights and recurrent weights of the RNN g.

In some embodiments, the scaling vectors modify parameters of the RNN g by scaling each row of weight matrices.

At block 306, an approximate posterior probability distribution $q(z_t|x_{\leq t}, z_{<t})$ is determined for the latent variable $z_t$, given the observation state $x_t$, previous observations $x_{<t}$ and previous latent variables $z_{<t}$, from an encoder network $\phi^{enc}$ of the VHRNN using the observation state $x_t$ and the initial hidden state $h_{t-1}$.

At block 308, a generating probability distribution $p(x_t|z_{\leq t}, x_{<t})$ is determined for the observation state $x_t$, given the latent variable $z_t$, the previous observations $x_{<t}$ and the previous latent variables $z_{<t}$, from a decoder network $\phi^{dec}$ of the VHRNN using the latent variable $z_t$ and the initial hidden state $h_{t-1}$.

In some embodiments, the generating probability distribution $p(x_t|z_{\leq t}, x_{<t})$ for the observation state $x_t$ is based on equation (2):

$$x_t|z_{\leq t}, x_{<t} \sim \mathcal{N}(\mu_t^{dec}, \Sigma_t^{dec})$$

where $(\mu_t^{dec}, \Sigma_t^{dec}) = \phi_{\omega(z_t, h_{t-1})}^{dec}(z_t, h_{t-1})$, and $\omega(z_t, h_{t-1})$ is another hypernetwork of the VHRNN that generates parameters of the decoder network $\phi^{dec}$ using the latent variable $z_t$ and the initial hidden state $h_{t-1}$.

In some embodiments, the hypernetwork $\omega(z_t, h_{t-1})$ is implemented as a multilayer perceptron (MLP).

At block 310, a variational lower bound of a marginal log-likelihood of the training data is maximized, to train the VHRNN.

In some embodiments, the variational lower bound includes at least one of an evidence lower bound (ELBO), importance weight autoencoders (IWAE), or filtering variational objectives (FIVO).

In some embodiments, the trained VHRNN is stored in a memory such as memory 220.

In some embodiments, a VHRNN model 110 trained, for example, using method 300, may be stored on a computer readable memory, such as memory 220, of a non-transitory computer readable medium, trained VHRNN model 110 executable by a computer, such as processor(s) 210, to perform a method to generate sequential data, such as method 350 described below.

It should be understood that the blocks may be performed in a different sequence or in an interleaved or iterative manner.

Figure 3B:
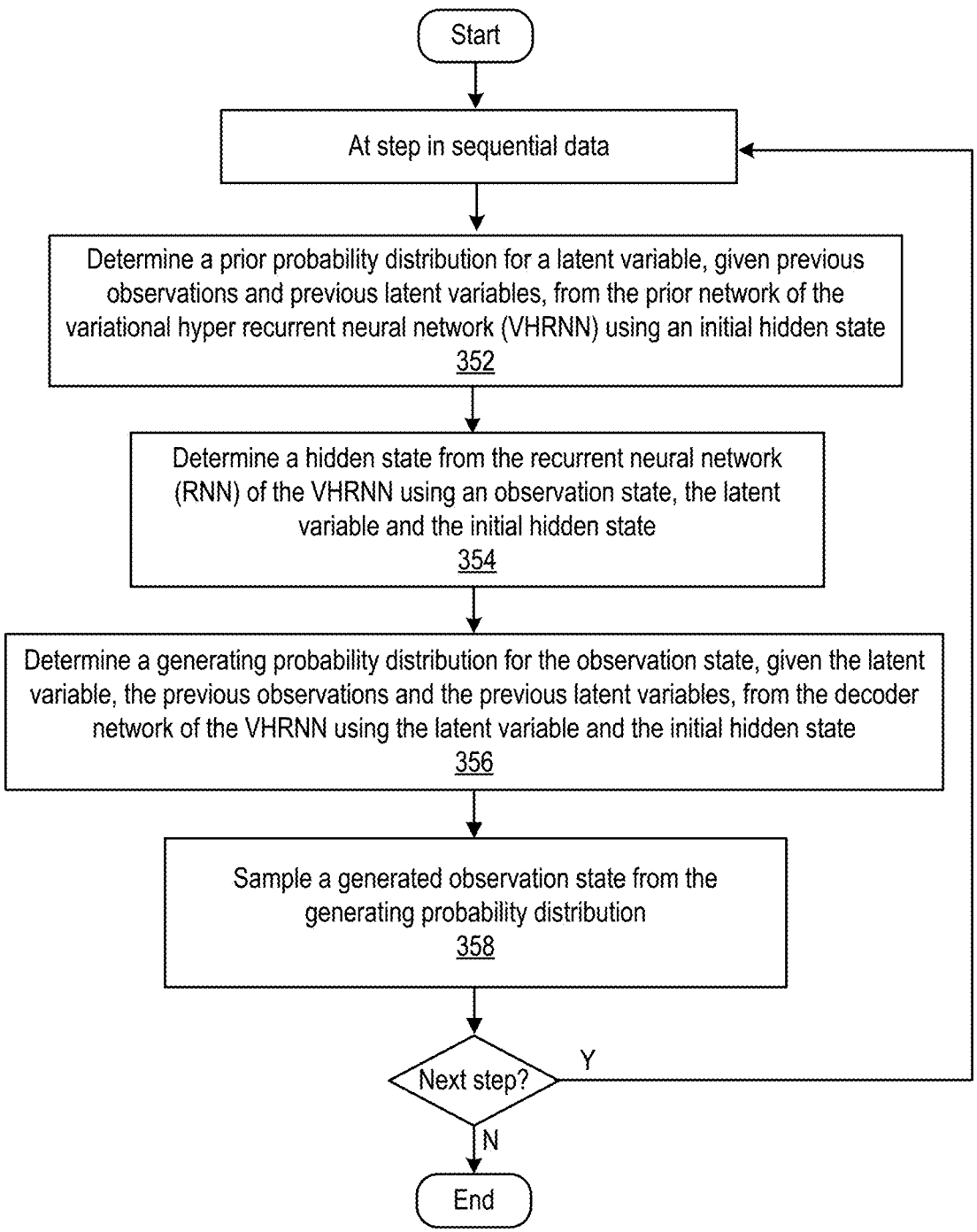
FIG. 3B is a flow chart of a method for generating sequential data using a VHRNN, according to an embodiment.

FIG. 3B is a flow chart of a method 350 for generating sequential data using a VHRNN such as VHRNN model 110, in an example, trained by method 300, according to an embodiment. The steps are provided for illustrative purposes. Variations of the steps, omission or substitution of various steps, or additional steps may be considered.

Blocks 352 to 358 are performed for each step or time step t from 1 to T in sequential data, such as time series data. In some embodiments, there is no pre-specified length (or number of steps) of a sequence, and method 350 may use step-wise generation for any suitable length of sequence.

At block 352, a prior probability distribution $p(z_t|x_{<t}, z_{<t})$ is determined for a latent variable $z_t$, given previous observations $x_{<t}$ and previous latent variables $z_{<t}$, from the prior network $\phi^{prior}$ of the VHRNN using an initial hidden state $h_{t-1}$.

In some embodiments, the prior probability distribution $p(z_t|x_{<t}, z_{<t})$ for the latent variable $z_t$ is based on equation (3):

$$z_t|x_{<t}, z_{<t} \sim \mathcal{N}(\mu_t^{prior}, \Sigma_t^{prior})$$

where $(\mu_t^{prior}, \Sigma_t^{prior})$ is the prior network $\phi^{prior}$.

At block 354, a hidden state $h_t$ is determined from the recurrent neural network (RNN) g of the VHRNN using an observation state $x_t$, the latent variable $z_t$ and the initial hidden state $h_{t-1}$.

In some embodiments, the RNN g is based on equation (1):

$$h_t = g_{\theta(z_t, h_{t-1})}(x_t, z_t, h_{t-1})$$

where $\theta(z_t, h_{t-1})$ is a hypernetwork of the VHRNN that generates parameters of RNN g using the latent variable $z_t$ and the initial hidden state $h_{t-1}$.

In some embodiments, the hypernetwork $\theta(z_t, h_{t-1})$ is implemented as a recurrent neural network (RNN).

In some embodiments, the hypernetwork $\theta(z_t, h_{t-1})$ is implemented as a long short-term memory (LSTM).

In some embodiments, the hypernetwork $\theta(z_t, h_{t-1})$ generates scaling vectors for input weights and recurrent weights of the RNN g.

In some embodiments, the scaling vectors modify parameters of the RNN g by scaling each row of weight matrices.

At block 356, a generating probability distribution $p(x_t|z_{\leq t}, x_{<t})$ is determined for the observation state $x_t$ given the latent variable $z_t$, the previous observations $x_{<t}$ and the previous latent variables $z_{<t}$, from the decoder network $\phi^{dec}$ of the VHRNN using the latent variable $z_t$ and the initial hidden state $h_{t-1}$.

In some embodiments, the generating probability distribution $p(x_t|z_{\leq t}, x_{<t})$ for the observation state $x_t$ is based on equation (2):

$$x_t|z_{\leq t}, x_{21} \sim \mathcal{N}(\mu_t^{dec}, \Sigma_t^{dec})$$

where $(\mu_t^{dec}, \Sigma_t^{dec}) = \phi_{\omega(z_t, h_{t-1})}^{dec}(z_t, h_{t-1})$ is another hypernetwork of the VHRNN that generates parameters of the decoder network $\phi^{dec}$ using the latent variable $z_t$ and the initial hidden state $h_{t-1}$.

In some embodiments, the hypernetwork $\omega(z_t, h_{t-1})$ is implemented as a multilayer perceptron (MLP).

At block 358, a generated observation state $x_t$ is sampled from the generating probability distribution $p(x_t|z_{\leq t}, x_{<t})$. The sampled observation states may then form the generated sequential data.

In some embodiments, future observations of the sequential data are forecasted based on the sampled generated observation states.

In some embodiments, the sequential data is time-series financial data.

It should be understood that the blocks may be performed in a different sequence or in an interleaved or iterative manner.

Figure 4:
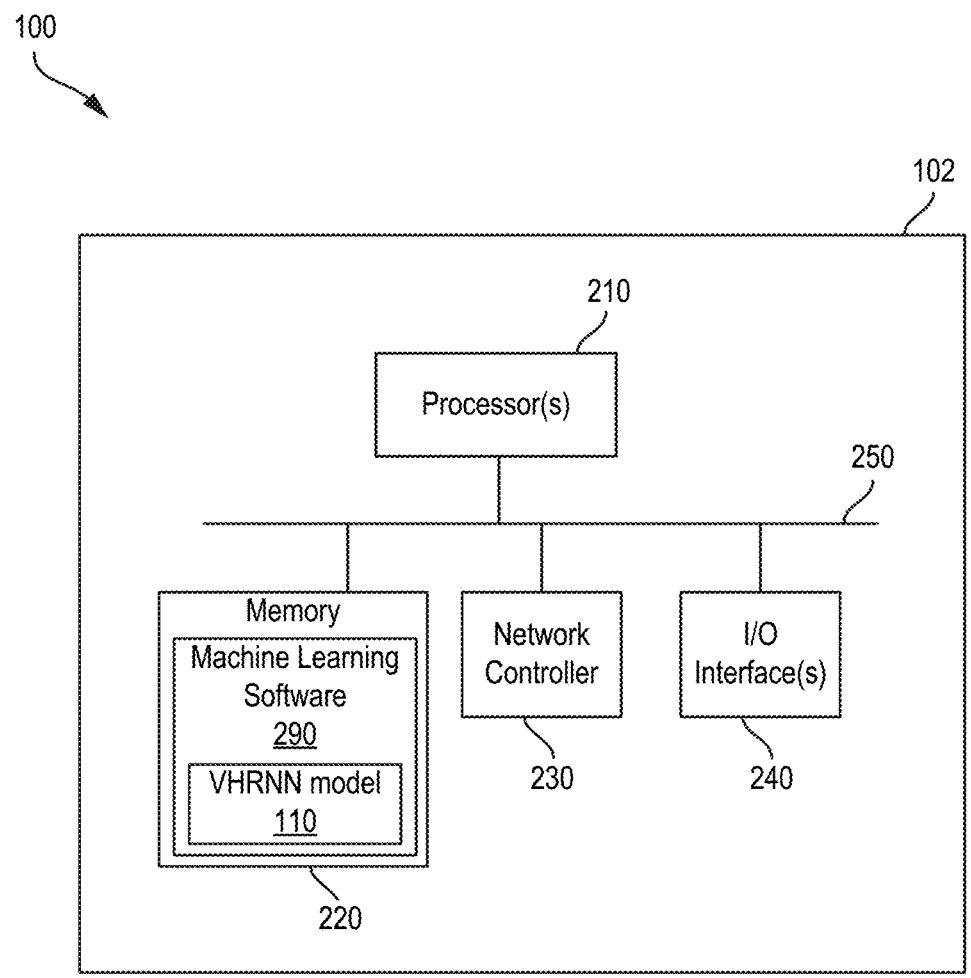
FIG. 4 is a block diagram of example hardware and software components of a computing device for VHRNN modelling, according to an embodiment.

System 100 for VHRNN modelling, to model sequential data, may be implemented as software and/or hardware, for example, in a computing device 120 as illustrated in FIG. 4. Method 300, in particular, one or more of blocks 302 to 310, may be performed by software and/or hardware of a computing device such as computing device 120. Method 350, in particular, one or more of blocks 352 to 358, may be performed by software and/or hardware of a computing device such as computing device 120.

FIG. 4 is a high-level block diagram of computing device 102. As will become apparent, computing device 102, under software control, may train VHRNN model 110 and use VHRNN model 110 to generate sequential data such as time-series data.

As illustrated, computing device 102 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 102. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 102 may include machine learning software 290 to generate VHRNN model 110, and operating system (OS) software (not shown) allowing for basic communication and application operations related to computing device 102.

Memory 220 may include machine learning software 290 with rules and models such as VHRNN model 110. Machine learning software 290 can refine based on learning. Machine learning software 290 can include instructions to implement an artificial neural network, such as generating VHRNN model 110, and performing sequence modelling and generating using VHRNN model 110.

As compared to a large VRNN, the structure of VHRNN model 110 conveniently better encodes the inductive bias that the underlying dynamics could change; that is, they could slightly deviate from the typical behavior in a regime, or there could be a drastic switch to a new regime. With finite training data and a finite number of parameters, this inductive bias could lead to qualitatively different learned behavior, which is demonstrated and analyzed below, providing a systematic generalization study of VHRNN in comparison to a VRNN baseline.

An example VHRNN model 110 and an example VRNN baseline model are trained on one synthetic dataset with each sequence generated by fixed linear dynamics and corrupted by heteroskedastic noise processes. It is demonstrated that VHRNN model 110 can disentangle the two contributions of variations and learn the different base patterns of the complex dynamics while doing so with fewer parameters. Furthermore, VHRNN model 110 can generalize to a wide range of unseen dynamics, albeit the much simpler training set.

A synthetic dataset can be generated by the following recurrence equation:

$$x_t = W x_{t-1} + \sigma_t \epsilon_t \qquad (6)$$

where $\epsilon_t \in \mathbb{R}^2$ is a two-dimensional standard Gaussian noise and $x_0$ is randomly initialized from a uniform distribution over $[-1,1]^2$.

For each sequence, $W \in \mathbb{R}^{2\times 2}$ is sampled from ten pre-defined random matrices $\{W_i\}_{i=1}^{10}$ with equal probability; $\sigma_t$ is the standard deviation of the additive noise at time t and takes a value from $\{0.25, 1, 4\}$. The noise level shifts twice within a sequence; i.e., there are exactly two t's such that $\sigma_t \neq \sigma_{t-1}$.

Eight hundred sequences are generated for training, one hundred sequences for validation, and one hundred sequences for test using the same sets of predefined matrices.

The example VRNN baseline model and example VHRNN model 110 are trained and evaluated using FIVO as the objective. The results on the test set are almost the same as those on the training set for both VRNN and VHRNN model 110. VHRNN model 110 shows better performance than baseline VRNN with fewer parameters, as shown in the table illustrated in FIG. 5, under the "Test" column. The size of the hidden state in RNN cells is set to be the same as the latent size for both types of models.

FIG. 5 also illustrates the behaviour of the example VRNN baseline models and example VHRNN model 110 under the following systematically varied settings:

NOISELESS: In this setting, sequences are generated using a similar recurrence rule with the same set of predefined weights without the additive noise at each step. That is, $\sigma_t=0$ in Eq. 6 for all time step t. The exponential growth of data could happen when the singular values of the underlying weight matrix are greater than 1.

SWITCH: In this setting, three NOISELESS sequences are concatenated into one, which contains regime shifts as a result. This setting requires the model to identify and re-identify the underlying pattern after observing changes.

LONG: In this setting, extra-long NOISELESS sequences are generated with twice the total number of steps using the same set of predefined weights. The data scale can exceed well beyond the range of training data when exponential growth happens.

ZERO-SHOT: In this setting, NOISELESS sequences are generated such that the training data and test data use different sets of weight matrices.

ADD: In this setting, sequences are generated by a different recurrence rule: $x_t = x_{t-1} + b$, where b and $x_0$ are uniformly sampled from $[0,1]^2$.

RAND: In this setting, the deterministic transition matrix in equation (6) is set to the identity matrix (i.e., W=I), leading to long sequences of pure random walks with switching magnitudes of noise. The standard deviation of the additive noise randomly switches up to 3 times within $\{0.25, 1, 4\}$ in one sequence.

The table of FIG. 5 illustrates the experimental results for the above settings on synthetic datasets. As shown, the example baseline VRNN model, depending on model complexity, either underfits the original data generation pattern ("Test") or fails to generalize to more complicated settings. In contrast, the example VHRNN model 110 does not suffer from such problems and uniformly outperforms VRNN models under all settings.

FIGS. 6A-6F illustrate observations from a qualitative study of the behavior of embodiments of an example baseline VRNN and an example VHRNN model 110 under a NOISELESS setting, the example baseline VRNN with a latent dimension of eight and the example VHRNN model 110 with a latent dimension of four.

Figure 6A:
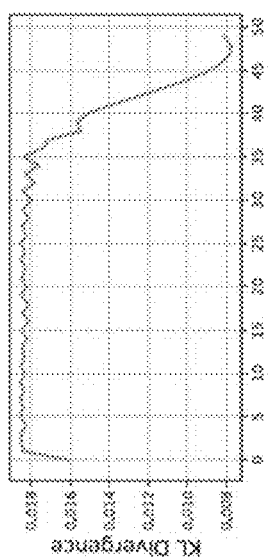
FIGS. 6A-6F illustrate observations from a qualitative study of the behavior of an example baseline VRNN and an example VHRNN model under a NOISELESS setting, according to an embodiment.
Figure 6B:
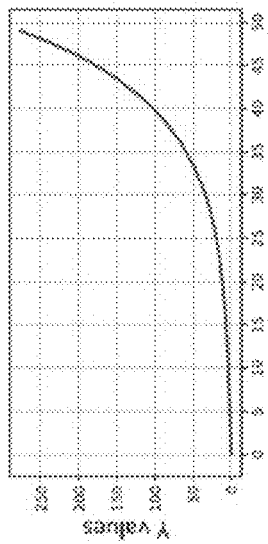
Figure 6C:
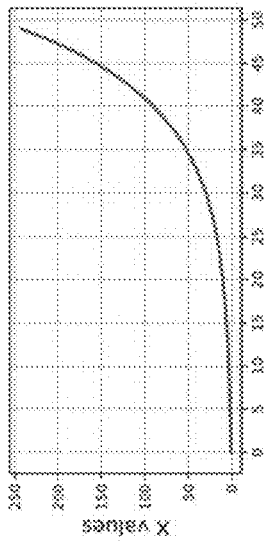
Figure 6D:
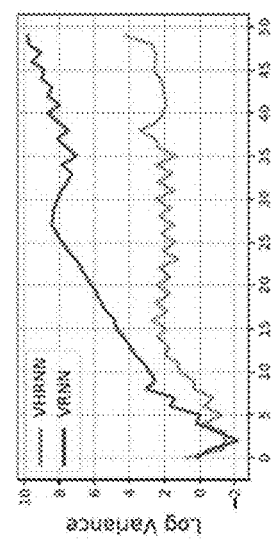
Figure 6E:
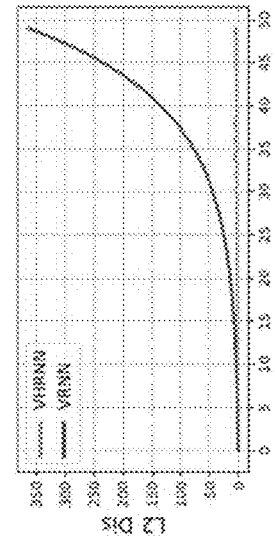
Figure 6F:
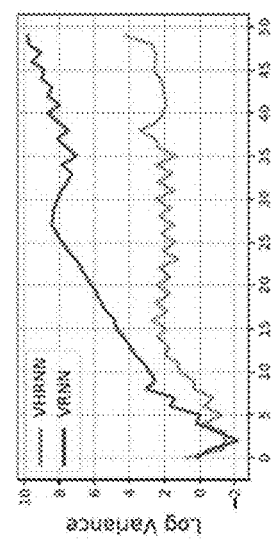

FIGS. 6A and 6B show the values of concatenated data at each time step. FIG. 6C shows the KL divergence between the variational posterior and the prior of the latent variable at each time step for the example VHRNN model 110. FIG. 6D shows the KL divergence for the example baseline VRNN. FIG. 6E shows L2 distance between the predicted mean values by the example VHRNN model 110 and the example baseline VRNN and the target. FIG. 6F shows the predicted log-variance of the output distribution for the example baseline VRNN and the example VHRNN model 110.

FIGS. 7A-7F illustrate observations from a qualitative study of the behavior of embodiments of an example baseline VRNN and an example VHRNN model 110 under a SWITCH setting, the example baseline VRNN with a latent dimension of eight and the example VHRNN model 110 with a latent dimension of four. Vertical dashed lines indicate time steps when regime shift happen.

Figure 7A:
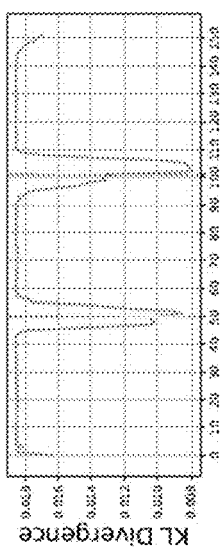
FIGS. 7A-7F illustrate observations from a qualitative study of the behavior of an example baseline VRNN and an example VHRNN model under a SWITCH setting, according to an embodiment.
Figure 7B:
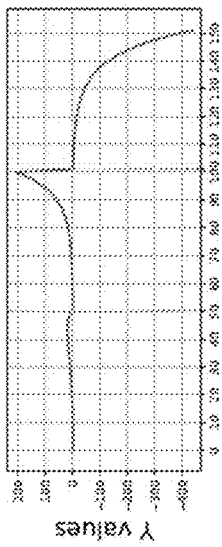
Figure 7C:
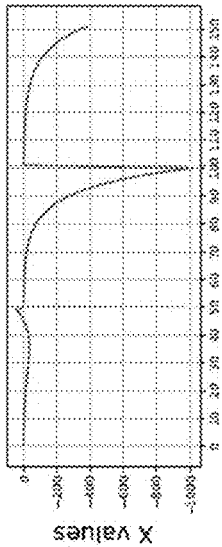
Figure 7D:
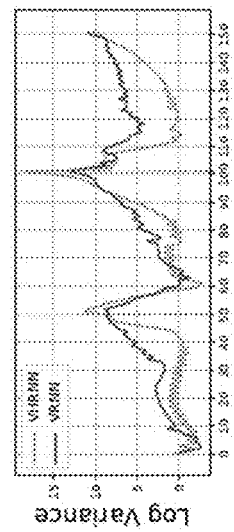
Figure 7E:
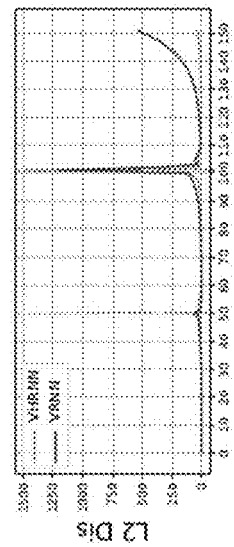
Figure 7F:
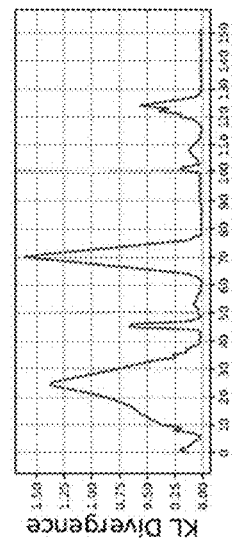

FIGS. 7A and 7B show the values of concatenated data at each time step. FIG. 7C shows the KL divergence between the variational posterior and the prior of the latent variable at each time step for the example VHRNN model 110. FIG. 7D shows the KL divergence for the example baseline VRNN. FIG. 7E shows L2 distance between the predicted mean values by VHRNN model 110 and the example baseline VRNN and the target. FIG. 7F shows the predicted log-variance of the output distribution for the example baseline VRNN and the example VHRNN model 110.

FIGS. 6A-6F demonstrate an observation of dynamic regime identification and re-identification. FIGS. 6A-6F show a sample sequence under the NOISELESS setting, whereby the example baseline VRNN has high KL divergence between the prior and the variational posterior most of the time, and in contrast, the example VHRNN model 110 has a decreasing trend of KL divergence while still making accurate mean reconstruction as it observes more data. As the KL divergence measures the discrepancy between prior defined in equation (3) and the posterior that has information from the current observation, simultaneous low reconstruction and low KL divergence means that the prior distribution would be able to predict with low errors as well, indicating that the correct underlying dynamics model has likely been utilized.

Conveniently, this trend indicates the ability of VHRNN model 110 to identify the underlying data generation pattern in the sequence. The decreasing trend is especially apparent when sudden and big changes in the scale of observations happen. Larger changes in scale may better help VHRNN model 110 identify the underlying data generation process because VHRNN model 110 is trained on sequential data generated with compound noise. The observation also confirms that the KL divergence would rise again once the sequence switches from one underlying weight to another, as shown in FIGS. 7A-7F. It is worth noting that the KL increase happens with some latency after the sequence switches in the SWITCH setting as VHRNN model 110 reacts to the change and tries to reconcile with the prior belief of the underlying regime in effect.

A similar trend of unseen regime generalization can also be found in settings where patterns of variation are not present in the training data, namely ZEROSHOT and ADD. Sample sequences are shown in FIGS. 8A-8F and FIGS. 9A-9F.

FIGS. 8A-8F illustrate observations from a qualitative study of the behavior of embodiments of an example baseline VRNN and an example VHRNN model 110 under a ZERO-SHOT setting, the example baseline VRNN with a latent dimension of eight and the example VHRNN model 110 with a latent dimension of four.

Figure 8A:
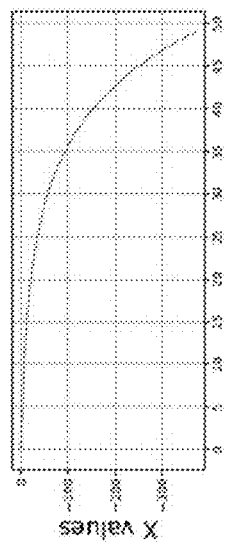
FIGS. 8A-8F illustrate observations from a qualitative study of the behavior of an example baseline VRNN and an example VHRNN model under a ZERO-SHOT setting, according to an embodiment.
Figure 8B:
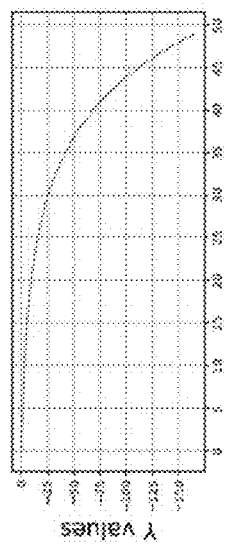
Figure 8C:
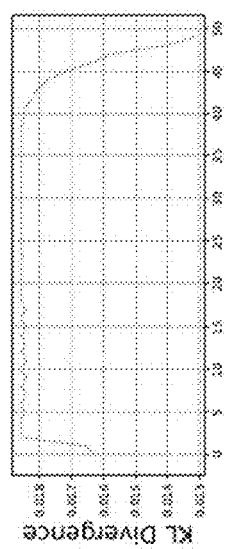
Figure 8D:
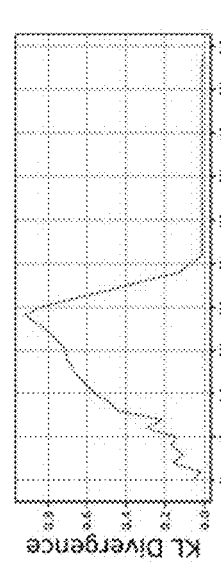
Figure 8E:
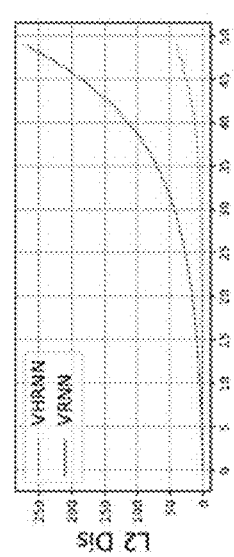
Figure 8F:
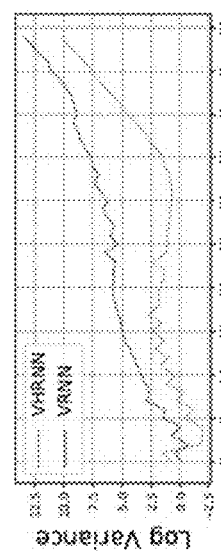

FIGS. 8A and 8B show the values of concatenated data at each time step. FIG. 8C shows the KL divergence between the variational posterior and the prior of the latent variable at each time step for example VHRNN model 110. FIG. 8D shows the KL divergence for the example baseline VRNN. FIG. 8E shows L2 distance between the predicted mean values by the example VHRNN model 110 and the example baseline VRNN and the target. FIG. 8F shows the predicted log-variance of the output distribution for the example baseline VRNN and the example VHRNN model 110.

FIGS. 9A-9F illustrate observations from a qualitative study of the behavior of embodiments of an example baseline VRNN and an example VHRNN model 110 under an ADD setting, the example baseline VRNN with a latent dimension of eight and the example VHRNN model 110 with a latent dimension of four.

Figure 9C:
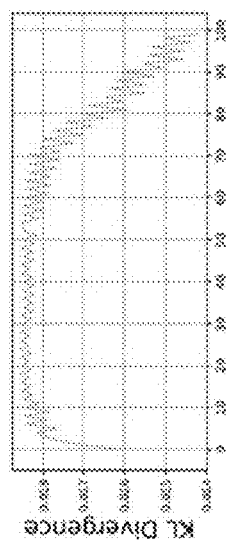
FIGS. 9A-9F illustrate observations from a qualitative study of the behavior of an example baseline VRNN and an example VHRNN model under an ADD setting, according to an embodiment.
Figure 9B:
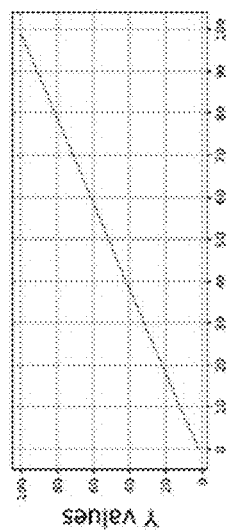
Figure 9A:
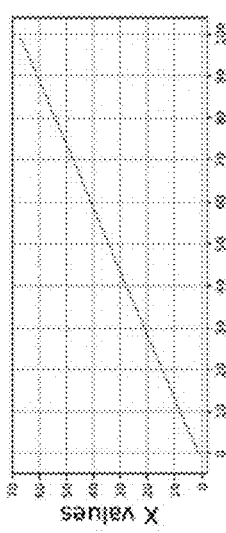
Figure 9F:
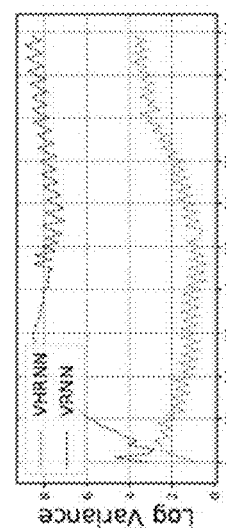
Figure 9E:
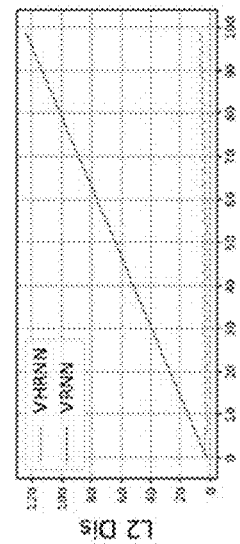
Figure 9D:
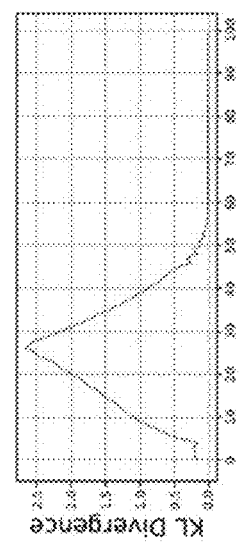

FIGS. 9A and 9B show the values of concatenated data at each time step. FIG. 9C shows the KL divergence between the variational posterior and the prior of the latent variable at each time step for the example VHRNN model 110. FIG. 9D shows the KL divergence for the example baseline VRNN. FIG. 9E shows L2 distance between the predicted mean values by the example VHRNN model 110 and the example baseline VRNN and the target. FIG. 9F shows the predicted log-variance of the output distribution for the example baseline VRNN and the example VHRNN model 110.

From FIGS. 8A-8F and 9A-9F, it can be seen that the KL divergence of the example VHRNN model 110 decreases as it observes more data. Meanwhile the mean reconstructions by the example VHRNN model 110 stay relatively close to the actual target value as shown in FIG. 8E and FIG. 9E. The reconstructions are especially accurate in the ADD setting as FIG. 9E shows.

The observation of unseen regime generalization implies that the ability of VHRNN model 110 to recover the data generation dynamics at test time is not limited to the existing patterns in the training data. By contrast, there is no evidence that traditional variational RNN is capable of doing similar regime identification.

Figure 10A:
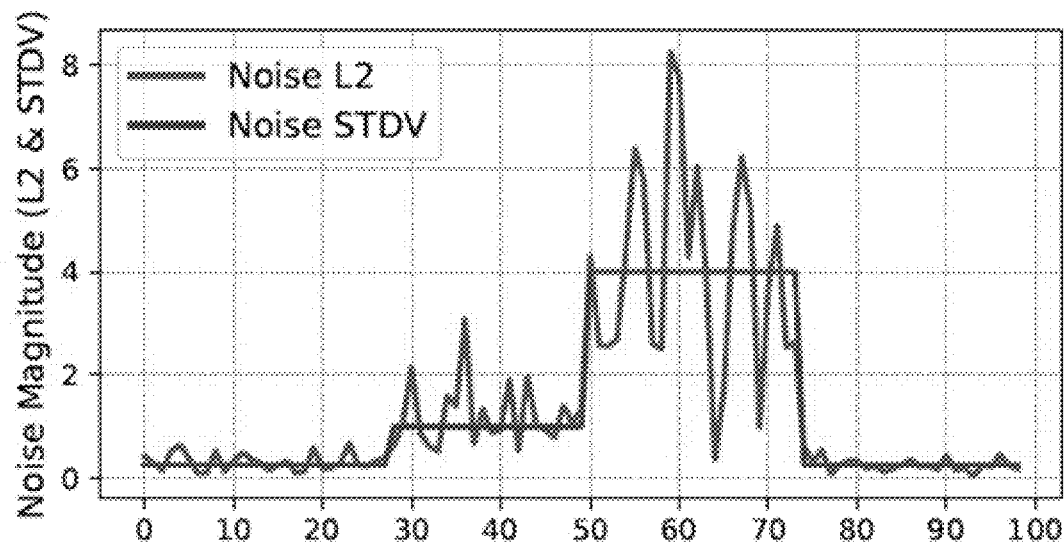
FIGS. 10A-10B illustrate observations from a qualitative study of the behavior of an example baseline VRNN and an example VHRNN model under a RAND setting, according to an embodiment.
Figure 10B:
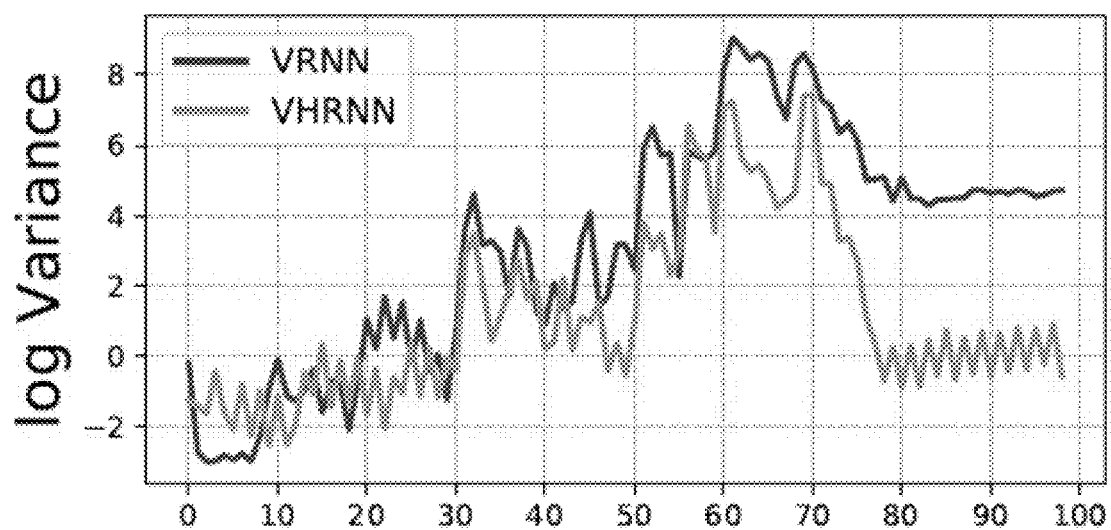

FIGS. 10A-10B illustrate observations from a qualitative study of the behavior of embodiments of an example baseline VRNN and an example VHRNN model 110 under a RAND setting, the example baseline VRNN with a latent dimension of eight and the example VHRNN model 110 with a latent dimension of four.

FIG. 10A shows the L2 norm and standard deviation of the additive noise at each time step. FIG. 10B shows the log-variance of the output distribution for the example baseline VRNN and the example VHRNN model 110.

In some embodiments, uncertainty identification is also observed. FIGS. 10A and 10B show that the predicted log-variance of VHRNN model 110 can more accurately reflect the change of noise levels under the RAND setting than a baseline VRNN. VHRNN model 110 can also better handle uncertainty than the baseline VRNN in the following situations. As shown in FIG. 7F, in some embodiments, VHRNN model 110 can more aggressively adapt its variance prediction based on the scale of the data than a baseline VRNN. It keeps its predicted variance at a low level when the data scale is small and increases the value when the scale of data becomes large. VHRNN model 110 makes inaccurate mean prediction relatively far from the target value when the switch of underlying generation dynamics happens in the SWITCH setting. The switch of the weight matrix is another important source of uncertainty. In some embodiments, VHRNN model 110 would also make a large log-variance prediction in this situation, even the scale of the observation is small. Aggressively increasing its uncertainty about the prediction when a switch happens avoids VHRNN model 110 from paying high reconstruction cost as shown by the second spike in FIG. 7F. This increase of variance prediction also happens when exponential growth becomes apparent in setting LONG and the scale of observed data became out of the range of the training data. Given the large scale change of the data, such flexibility to predict large variance is key for VHRNN model 110 to avoid paying large reconstruction cost.

FIGS. 11A-11F illustrate observations from a qualitative study of the behavior of an example baseline VRNN and an example VHRNN model 110 under a LONG setting, according to an embodiment. FIGS. 11A, 11B, 11D and 11E use scientific notations for the value of Y axis. The magnitude of the data grows rapidly in such setting due to exponential growth and it is well beyond the scale of training data.

Figure 11C:
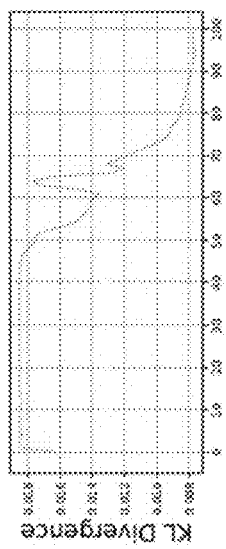
FIGS. 11A-11F illustrate observations from a qualitative study of the behavior of an example baseline VRNN and an example VHRNN model under a LONG setting, according to an embodiment.
Figure 11B:
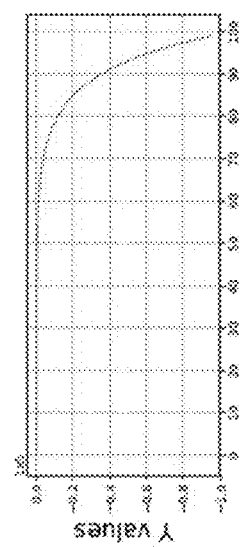
Figure 11A:
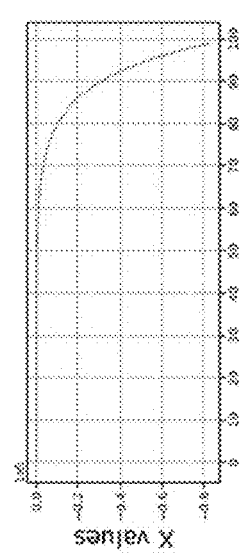
Figure 11F:
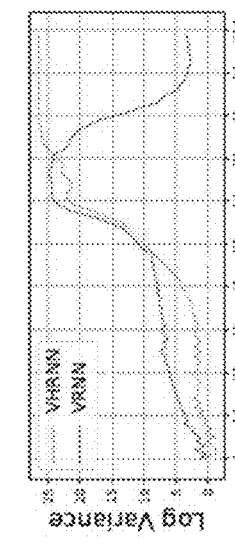
Figure 11E:
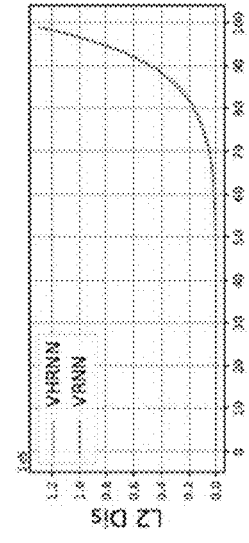
Figure 11D:
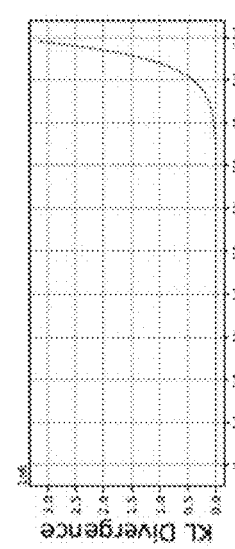

FIGS. 11A and 11B show the values of concatenated data at each time step. FIG. 11C shows the KL divergence between the variational posterior and the prior of the latent variable at each time step for the example VHRNN model 110. FIG. 11D shows the KL divergence for the example baseline VRNN. FIG. 11E shows L2 distance between the predicted mean values by the example VHRNN model 110 and the example baseline VRNN and the target. FIG. 11F shows the predicted log-variance of the output distribution for the example baseline VRNN and the example VHRNN model 110.

As illustrated in FIGS. 11A-11F, both baseline VRNN and VHRNN model 110 may make inaccurate mean predictions that are far from the target values. However, VHRNN model 110 pays smaller reconstruction cost than the baseline VRNN by also making large predictions of variance. This setting demonstrates a special case in which VHRNN model 110 has better ability to handle uncertainty in data than a baseline vanilla variational RNN.

Conveniently, these advantages of VHRNN model 110 over a baseline VRNN illustrate the better performance of VHRNN model 110 on synthetic data and demonstrate an ability to model real-world data with large variations both across and within sequences.

Experiments were performed with example embodiments of VHRNN model 110 on several real-world datasets and compared against example baseline VRNN to demonstrate superior parameter performance efficiency of VHRNN model 110. FIGS. 12A-12D illustrate parameter-performance comparison of example baseline VRNNs and example VHRNN models 110 on real-world datasets, according to embodiments.

Training and evaluating VRNN using FIVO [Maddison et al, 2017] demonstrates state-of-the-art performance on various sequence modeling tasks. The experiments performed demonstrate the superior parameter-performance efficiency and generalization ability of VHRNN model 110 over baseline VRNN. All the models were trained using FIVO [Maddison et al, 2017] and FIVO per step reported when evaluating models.

Two polyphonic music dataset were considered: JSB Chorale and Piano-midi.de [Boulanger-Lewandowski et al, 2012]. The models were also trained and tested on Stock dataset containing a financial time series data and an HT Sensor dataset [Huerta et al, 2016], which contains sequences of sensor readings when different types of stimuli are applied in an environment during experiments. A Hyper-LSTM model is also considered without latent variables proposed by [Ha et al, 2016] for comparison purposes.

For all the real-world data, both example baseline VRNNs and example VHRNN models 110, are trained with batch size of 4 and particle size of 4. When evaluating the models, a particle size of is used 128 for polyphonic music datasets and 1024 is used for Stock and HT Sensor datasets.

For real-world dataset experimentation, a single-layer LSTM was used for the example baseline VRNN models, and the dimension of the hidden state was set to be the same as the latent dimension. For the example VHRNN models 110, θ in equation (1) was implemented using a single-layer LSTM to generate weights for the recurrence module in the primary networks. An RNN cell with LSTM-style gates and update rules for the recurrence module g was used. The hidden state sizes of both the primary network and hyper network are the same as the latent dimension. A linear transformation directly maps the hyper hidden state to the scaling and bias vectors in the primary network. Further detail on the architectures of encoder, generation and prior networks are provided below.

In some embodiments, implementation of the architecture of the encoder in equation (5) is the same in the example VHRNN models 110 and the example baseline VRNNs. For synthetic datasets, the encoder may be implemented by a fully-connected network with two hidden layers; each hidden layer has the same number of units as the latent variable dimension. For real-world datasets, a fully-connected network may be used, with one hidden layer. The number of units may also be the same as the latent dimension. In some embodiments, the prior network is implemented by a similar architecture as the encoder, differing in the dimension of inputs.

In some embodiments, for implementation of example VHRNN models 110, fully-connected hyper networks with two hidden layers are used for synthetic data and fully-connected hyper networks with one hidden layer for other datasets as the decoder networks. The number of units in each hidden layer may also be the same as the latent variable defined in equation (2). For each layer of the hyper networks, the weight scaling vector and bias may be generated by an two-layer MLP. In some embodiments, the hidden layer size of this MLP is 8 for synthetic dataset and 64 for real-world datasets. For the example baseline VRNN models, plain feed-forward networks may be used for decoder. The number of hidden layers and units in the hidden layer may be determined in the same way as VHRNN model 110.

For comparison with a baseline VRNN [Chung et al, 2015], in some embodiments, the latent variable and observations are encoded by a network different from the encoder in equation (5) before being fed to the recurrence network and encoder. The latent and observation encoding networks may have the same architecture except for the input dimension in each experiment setting. For synthetic datasets, the encoding network may be implemented by a fully-connected network with two hidden layers. For real-world datasets, a fully-connected network may be used, with one hidden layer. The number of units in each hidden layer may be the same as the dimension of latent variable in that setting.

JSB Chorale and Piano-midi.de are polyphonic music datasets [Boulanger-Lewandowski et al, 2012] with complex patterns and large variance both within and across sequences. The datasets are split into train, validation, and test sets.

For preprocessing of the polyphonic music datasets, JSB Chorale and Piano-midi.de, each sample is represented as a sequence of 88-dimensional binary vectors. The data are preprocessed by mean-centering along each dimension per dataset.

FIG. 12A illustrates FIVO per time step of example VHRNN models 110 and example baseline VRNNs and their parameter counts trained and evaluated on the JSB Chorale dataset, according to an embodiment. FIG. 12B illustrates FIVO per time step of example VHRNN models 110 and example baseline VRNNs and their parameter counts trained and evaluated on the Piano-midi.de dataset, according to an embodiment. The number of parameters and FIVO per time step of each model are plotted in FIGS. 12A and 12B, and the latent dimension is also annotated.

The results show that VHRNN model 110 has better performance and parameter efficiency. The parameter-performance plots in FIGS. 12A and 12B show that VHRNN model 110 has uniformly better performance than baseline VRNN with a comparable number of parameters.

As illustrated in FIG. 12A, the best FIVO achieved by an example VHRNN model 110 on JSB dataset is −6.76 (VHRNN-14) compared to −6.92 for an example baseline VRNN (VRNN-32), which requires close to one third more parameters. This best example baseline VRNN model is even worse than the smallest example VHRNN model 110 evaluated. It is also observed that VHRNN model 110 is less prone to overfitting and has better generalization ability than baseline VRNN when the number of parameters keeps growing. Similar trends can be seen on the Piano-midi.de dataset in FIG. 12B.

Figure 13:
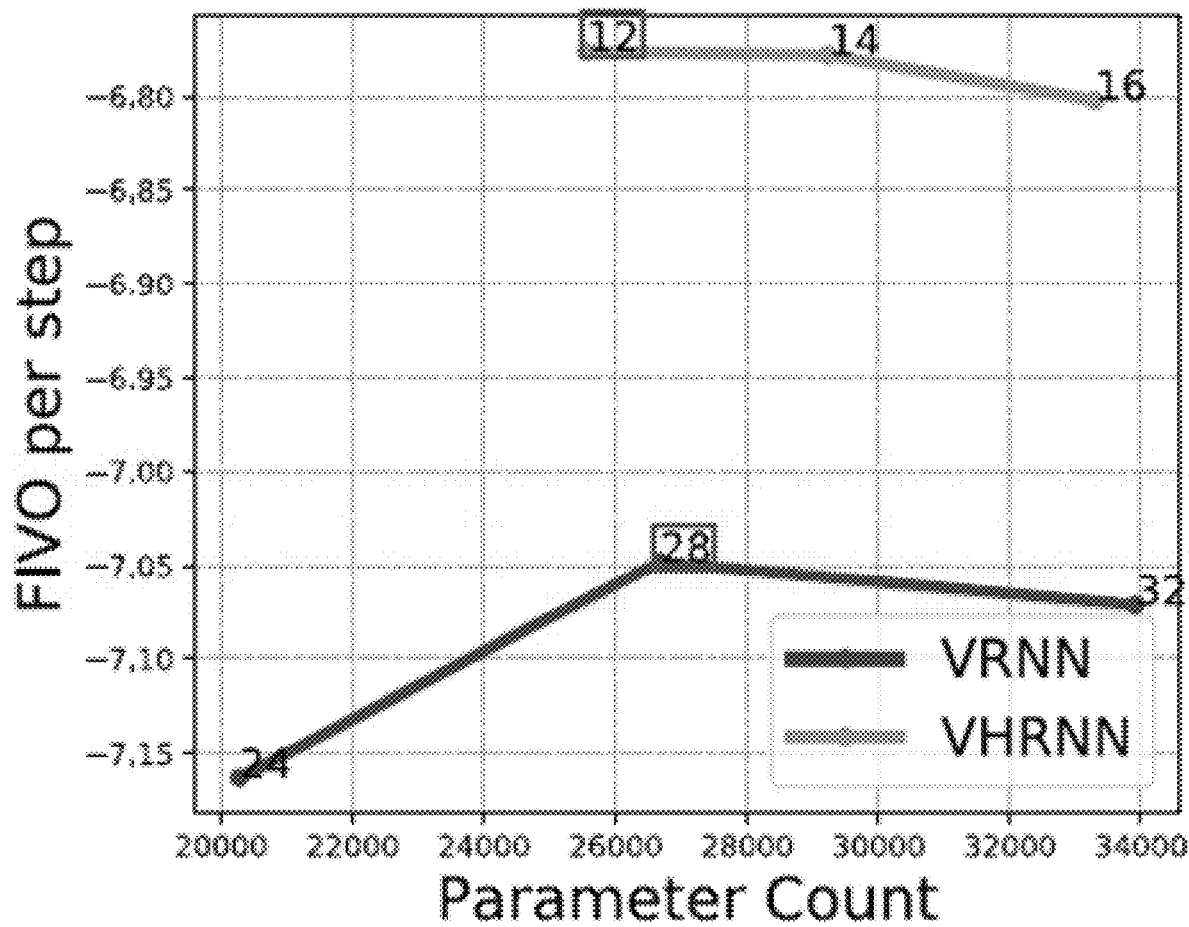
FIG. 13 illustrates parameter performance plots of example baseline VRNNs and example VHRNN models using GRU implementation, according to an embodiment.

Experimental work to-date also indicates better performance of VHRNN model 110 over baseline VRNN in a scenario replacing LSTM with Gated Recurrent Unit (GRU). FIG. 13 shows the parameter performance plots of example VHRNN models 110 and example baseline VRNNs using GRU implementation on the JSB Chorale dataset. As shown in FIG. 13, VHRNN models 110 consistently outperform baseline VRNN models under all settings.

Financial time series data, such as daily prices of stocks, can be highly volatile with large noise. Market volatility can be affected by many external factors and can experience tremendous changes in a short period of time. To test ability to adapt to different volatility levels and noise patterns, example baseline VRNNs and example VHRNN models 110 were compared on a stock dataset containing stock price data collected in a period when the market went through rapid changes. The Stock dataset includes data collected from 445 stocks in the S&P 500 index in 2008 when a global financial crisis happened.

To generate the Stock dataset, 345 companies were randomly selected for their daily stock price and volume in the first half of 2008 to obtain training data. Another 50 companies' data from the second half of 2008 was acquired to generate validation set and the test set was obtained from the remaining 50 companies during the second half of 2008. The sequences were first preprocessed by taking log ratio of the values between consecutive days, each sequence having a fixed length of 125. The log ratio sequences were normalized using the mean and standard deviation of the training set along each dimension.

The Stock dataset contains the opening, closing, highest and lowest prices, and volume on each day. The networks are trained on sequences from the first half of the year and tested on sequences from the second half, during which the market suddenly became significantly more volatile due to the financial crisis.

The evaluation results of example baseline VRNNs and example VHRNN models 110 trained and evaluated on the Stock dataset are shown in FIG. 12C. The number of parameters and FIVO per time step of each model are plotted in FIG. 12C, and the latent dimension is also annotated. The plot shows that VHRNN models 110 consistently outperform baseline VRNN models regardless of the latent dimension and number of parameters. The results indicate that VHRNN model 110 may have better generalizability to sequential data in which the underlying data generation pattern suddenly shifts even if the new dynamics are not seen in the training data.

A comparison of baseline VRNNs and VHRNN models 110 was also performed on a HT Sensor dataset, having less variation and simpler patterns than the previous datasets. The HT Sensor dataset contains sequences of gas, humidity, and temperature sensor readings in experiments where some stimulus is applied after a period of background activity [Huerta et al, 2016]. There are two types of stimuli in the experiments: banana and wine. In some sequences, there is no stimulus applied, and they only contain readings under background noise.

The HT Sensor dataset collects readings from 11 sensors under certain stimulus in an experiment. The readings of the sensors are recorded at a rate of once per second. A sequence of 3000 seconds every 1000 seconds in the dataset is segmented and downsampled by a rate of 30. Each sequence obtained has a fixed length of 100. The types of sequences include pure background noise, stimulus before and after background noise and stimulus between two periods of background noise. The data are normalized to zero mean and unit variance along each dimension. In some embodiments, 532 sequences are used for training, 68 sequences are used for validation and 74 sequences are used for testing.

Experimental results on for example baseline VRNNs and example VHRNN models 110 on HT Sensor dataset are shown in FIG. 12D. The number of parameters and FIVO per time step of each model are plotted in FIG. 12D, and the latent dimension is also annotated.

It is observed that VHRNN model 110 has comparable performance as the baseline VRNN on the HT Senor dataset when using a similar number of parameters. For example, VHRNN achieves a FIVO per time step of 14.41 with 16 latent dimensions and 24200 parameters, while baseline VRNN shows slightly worse performance with 28 latent dimensions and approximately 26000 parameters. When the number of parameters goes slightly beyond 34000, the FIVO of an example VHRNN model 110 decays to 12.45 compared to 12.37 of an example VRNN.

Figure 14A:
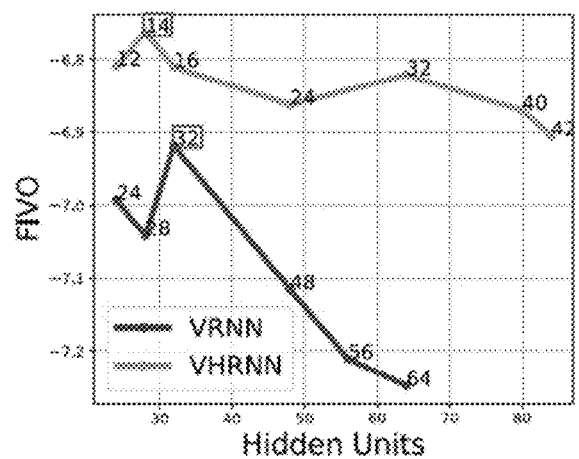
FIGS. 14A-14D illustrate comparisons of hidden units and performance of example baseline VRNNs and example VHRNN models on real-world datasets, according to embodiments.
Figure 14B:
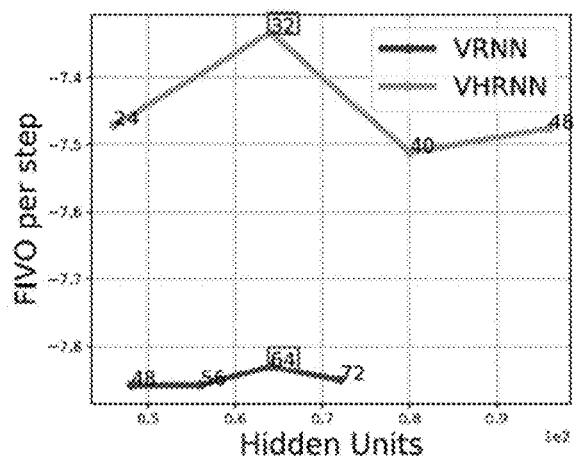
Figure 14C:
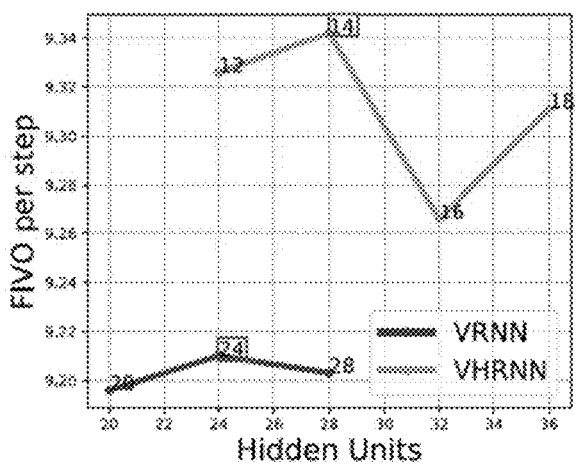
Figure 14D:
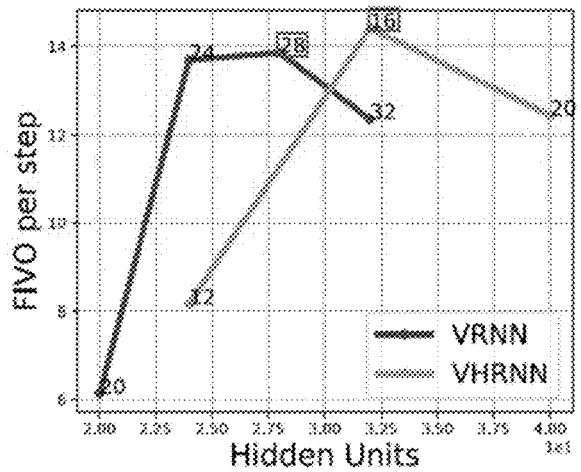

FIGS. 14A-14D illustrate comparisons of hidden units and performance of example baseline VRNNs and example VHRNN models 110 on real-world datasets, according to embodiments. In particular, FIG. 14A illustrates results on the JSB Chorale dataset, FIG. 14B illustrates results on the Piano-midi.de dataset, FIG. 14C illustrates results on the Stock dataset, and FIG. 14D illustrates results on the HT Sensor dataset. VHRNN model 110 and a baseline VRNN are compared by plotting the example models' performance against their number of hidden units.

The models considered in FIGS. 14A-14D are the same as the models presented in FIGS. 12A-12D, as described herein. A single-layer LSTM model is used for the RNN part, and the dimension of the LSTM's hidden state is the same as the latent dimension. Example VHRNN models 110 uses two LSTM models, one primary network and one hyper network. Therefore, the number of hidden units in an example VHRNN model 110 is twice the number of latent dimension.

As illustrated in FIGS. 14A-14D, VHRNN model 110 also dominates the performance of VRNN with a similar or fewer number of hidden units in most of the settings. Furthermore, the fact that VHRNN model 110 almost always outperforms the baseline VRNN for all parameter or hidden unit sizes precisely shows the superiority of the new architecture. The results from FIGS. 12A-12D and FIGS. 14A-14D are consolidated in a table illustrated in FIG. 15. FIG. 15 illustrates performance of example baseline VRNNs in the top table, and performance of example VHRNN models 110 in the bottom table, on real-world datasets, according to an embodiment.

In additional experimental work, VHRNN model 110 using LSTM cell is compared with the HyperLSTM models proposed in HyperNetworks [Ha et al, 2016] on JSB Chorale and Stock datasets. Compared with VHRNN model 110, HyperLSTM does not have latent variables. Therefore, it does not have an encoder or decoder either. The implementation of HyperLSTM resembles the recurrence model of VHRNN model 110 defined in equation (6). At each time step, HyperLSTM model predicts the output distribution by mapping the RNN's hidden state to the parameters of binary distributions for JSB Chorale dataset and a mixture of Gaussian for Stock dataset. Three and five are considered as the number of components in the Gaussian mixture distribution. HyperLSTM models are trained with the same batch size and learning rate as VHRNN models 110.

Figure 16B:
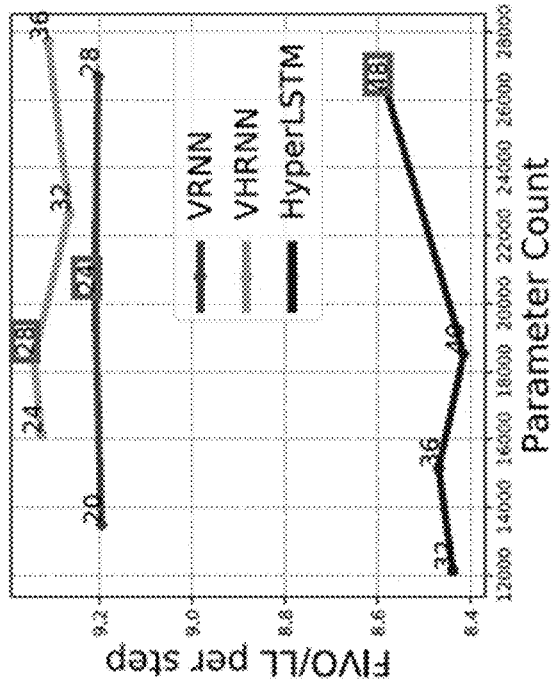
FIGS. 16A-16B illustrate comparisons of parameter count and performance of example baseline VRNNs, example VHRNN models, and example nHyperLSTM models on real-world datasets, according to an embodiment.
Figure 16A:
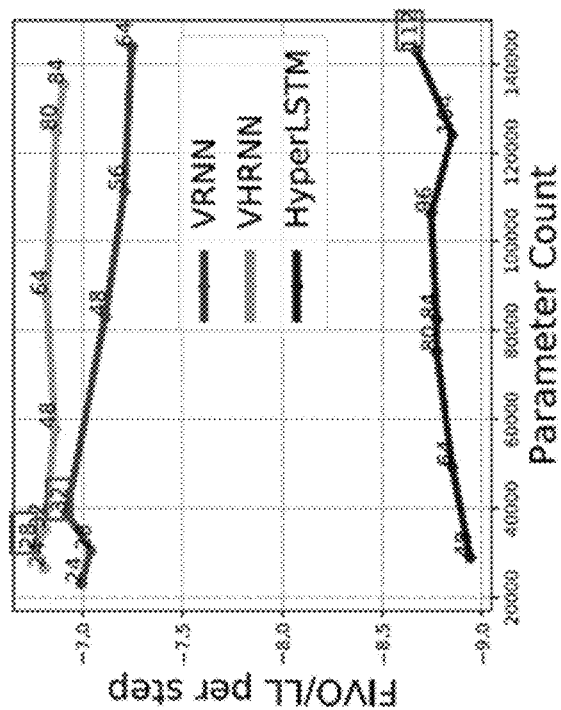

A parameter-performance comparison between example VHRNN models 110, example baseline VRNNs and example HyperLSTM models is illustrated in FIG. 16A for JSB Chorale dataset and FIG. 16B for Stock dataset. The number of components used by HyperLSTM for Stock dataset is five in the plot shown in FIG. 16B. Since HyperLSTM models do not have latent variable, the indicator on top of each point in FIGS. 16A, 16B shows the number of hidden units in each model for all three models. The number of hidden units for HyperLSTM model is also twice the dimension of hidden states as HyperLSTM has two RNNs, one primary and one hyper.

FIGS. 16A, 16B report FIVO for example VHRNN models 110 and example baseline VRNN models and exact log likelihood for example HyperLSTM models. Even though FIVO is a lower-bound of log likelihood, it can be seen that the performance of VHRNN model 110 completely dominates HyperLSTM regardless of the number of hidden units used. The performance of HyperLSTM is in fact worse than baseline VRNN models which do not have hyper networks. These results indicates the importance of modeling complex time-series data.

Figure 17B:
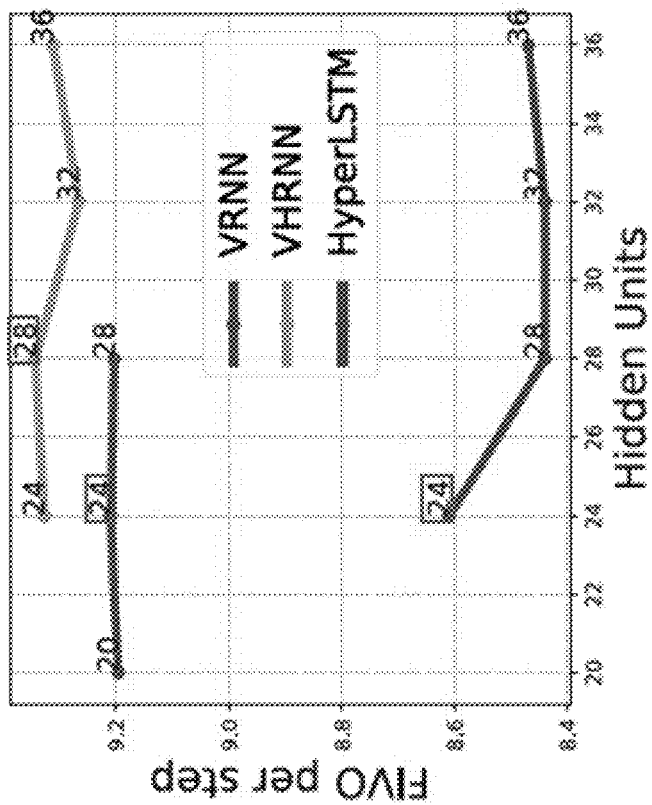
FIGS. 17A-17B illustrate comparisons of hidden units and performance of example baseline VRNNs, example VHRNN models, and example HyperLSTM models on real-world datasets, according to an embodiment.
Figure 17A:
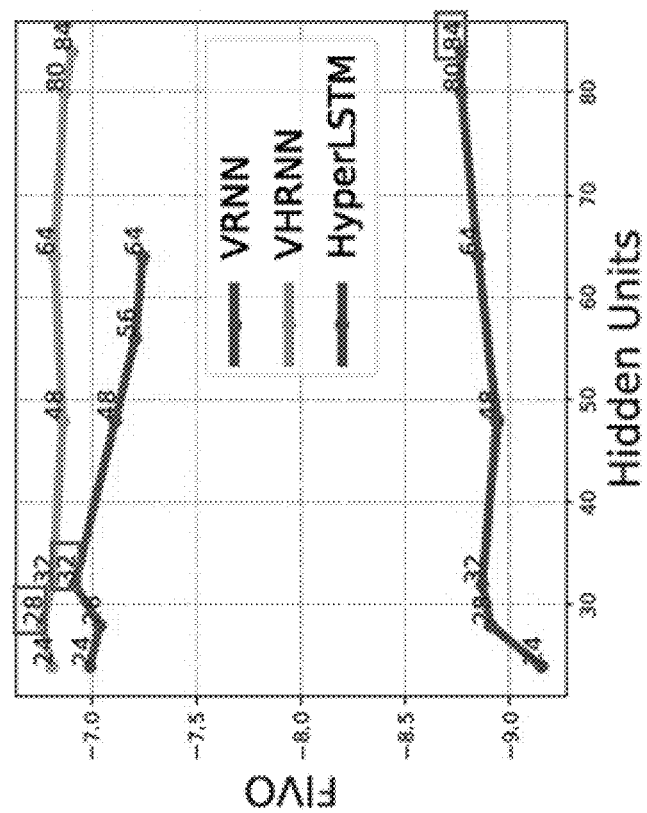

A hidden units and performance comparison between example VHRNN models 110 and example baseline VRNNs is illustrated in FIGS. 17A, 17B for JSB Chorale dataset and Stock dataset, respectively. The comparison shows similar results to those discussed above with reference to FIGS. 16A, 16B.

Complete experiment results of HyperLSTM models on datasets JSB Chorale and Stock are shown in FIG. 18.

The effects of hidden state and latent variable on the performance of a VHRNN model 110 have been considered in the following two aspects—the dimension of the latent variable and the contributions by hidden state and latent variable as inputs to hyper networks—examined by way of ablation studies, described in further detail below.

In experiments on real-world datasets with the latent dimension and hidden state dimension set to be the same for each model, an example VHRNN model 110 has significantly more parameters than a baseline VRNN when using the same latent dimension.

In further experimental work, to eliminate the effects of the difference in model size, the latent dimension and hidden state dimension are different and the hidden layer size of the hyper network that generates the weight of the decoder is reduced. These changes allow for a comparison of baseline VRNN and examples of VHRNN models 110 with the same latent dimension and a similar number of parameters. The results on JSB Chorale datasets are presented in FIG. 19 in which the latent dimension is denoted by "Z dim". As shown, example VHRNN models 110 have better FIVO with the same latent dimensions than example baseline VRNNs. The results show that the superior performance of VHRNN model 110 over baseline VRNN does not stem from smaller latent dimension when using the comparable number of parameters.

FIG. 20 illustrates results of example VHRNN models 110 with different hyper network inputs. Example VHRNN models 110 were retrained and their performance evaluated on JSB Chorale dataset and synthetic sequences when fed the latent variable only, the hidden state only, or both to the hyper networks.

As illustrated in FIG. 20, VHRNN model 110 may have the best performance and generalization ability when it takes the latent variable as its only input. Relying on the primary network's hidden state only or the combination of latent variable and hidden state may lead to worse performance. When the dimension of the hidden state is 32, VHRNN model 110 only taking the hidden state as hyper input suffers from over-parameterization and has worse performance than a baseline VRNN with the same dimension of the hidden state. On the test set of synthetic data, VHRNN model 110 obtains the best performance when it takes both hidden state and latent variable as inputs. This difference may be due to the fact that historical information is critical to determine the underlying recurrent weights and current noise level for synthetic data. However, the ablation study on both datasets shows the importance of the sampled latent variable as an input to the hyper networks. Therefore, both hidden state and latent variable are used as inputs to hyper networks on other datasets for consistency.

In some embodiments, an RNN may be used to generate the parameters of another RNN, for example, for VHRNN model 110 the hidden state of the primary RNN can represent the history of observed data while the hidden state of the hyper RNN can track the history of data generation dynamics.

As an ablation study, experimental work was performed with VHRNN models 110 that replace the RNN with a three-layer feed-forward network as the hyper network θ for the recurrence model g as defined in equation (6). The other components of VHRNN model 110 are unchanged on JSB Chorale, Stock and the synthetic dataset. The evaluation results using FIVO are presented in FIG. 21 and systematic generalization study results on the synthetic dataset are shown in FIG. 22. The example original VHRNN models are is denoted with recurrence structure in θ as "VHRNN-RNN" and the variant examples without the recurrence structure as "VHRNN-MLP".

As shown in FIGS. 21 and 22, given the same latent dimension, VHRNN-MLP models have more parameters than VHRNN-RNN models. VHRNN-MLP can have slightly better performance than VHRNN-RNN in some cases but it performs worse than VHRNN-RNN in more settings. The performance of VHRNN-MLP also degrades faster than VHRNN-RNN on the JSB Chorale dataset as the latent dimension increases. Moreover, systematic generalization study on the synthetic dataset illustrated in FIG. 22 also shows that VHRNN-MLP has worse performance than VHRNN-RNN no matter in the test setting or in the systematically varied settings.

Embodiments disclosed herein of a variational hyper RNN (VHRNN) model such as VHRNN model 110 can generate parameters based on the observations and latent variables dynamically. Conveniently, such flexibility enables VHRNN to better model sequential data with complex patterns and large variations within and across samples than traditional VRNN models that use fixed weights. In some embodiments, VHRNN can be trained with existing off-the-shelf variational objectives. Experiments on synthetic datasets with different generating patterns, as disclosed herein, show that VHRNN may better disentangle and identify the underlying dynamics and uncertainty in data than VRNN. Experimental work to-date also demonstrates the superb parameter-performance efficiency and generalization ability of VHRNN on real-world datasets with different levels of variability and complexity.

VHRNN as disclosed herein may allow for sequential or time-series data that is variable, for example, with very sudden underlying dynamic changes, to be modeled. The underlying dynamic may be a latent variable with sudden changes. Using VHRNN, it may be possible to infer such changes in the latent variable. Domains of variable sequential or time-series data that may be modelled and generated by VHRNN include financial data such as financial markets or stock market data, climate data, weather data, audio sequences, natural language sequences, environmental sensor data or any other suitable time-series or sequential data.

A conventional or baseline RNN may have difficulty capturing a sudden change in an underlying dynamic, for example, by assuming that the dynamic is constant. By contrast, a VHRNN may better capture such changes, as illustrated in experimental work as described herein. For example, experiments performed using synthetically generated data, as discussed above, demonstrate a VHRNN's usefulness.

VHRNN may capture such underlying dynamic changes with its unique latent variable methodology. Observation data is captured in the observation state $x_t$. Underlying dynamics are not observed, and are represented by latent variable, such as $z_t$, as used herein.

In an example of stock price time-series data, stock prices may be observed at each time step. However, there may exist underlying or latent variable(s) that are not observed or observable that may control the stock movement or performance. A latent variable can be, for example, macroeconomic factors, monetary policy, investor sentiment, leader confidence or mood, or any other factors affecting observable states such as stock prices. In an example, a latent variable such as a leader's mood can have two states: happy or unhappy, which may not be observable, and is a latent dynamic that may be manifested in VHRNN as a latent variable.

The VHRNN model disclosed herein provides for a latent variable that is dynamic, and VHRNN offers unique advantages in allowing the latent variable to change or update at each time step—the latent variable is thus a temporal latent variable that changes with time, and VHRNN is able to dynamically decode the latent information.

VHRNN thus can be effective in adapting to changes over time, in particular, by implementation of the hyper component. A hyper network component of VHRNN enables the dynamic of the RNN to change based on previous observation(s). A conventional VRNN, by contrast, assumes at every time step that the dynamic is the same, utilizing the same prior network or transition network. With a hyper network, as disclosed herein, the parameters of those networks can change at each time step. Thus, variability may be better captured to dynamically change the model.

VHRNN, by better inferring the underlying dynamics and latent variables, may provide insights into those underlying dynamics, depending on how those latent variables are interpreted. More accurate inference may allow for better decisions if based on such latent variables, and further, better generate samples that represent, in an example, future predictions.

In an example use case for prediction to forecast future stock price, a better understanding of latent dynamics may result in a better forecasting model. Once a VHRNN model is trained, it can be used to generate samples that can be used for forecasting. VHRNN may use a variational lower bound to capture a distribution. With a model that captures the distributions, there a number of downstream tasks that can then make use of the model as described herein.

N. Boulanger-Lewandowski, Y. Bengio, and P. Vincent. Modeling temporal dependencies in high-dimensional sequences: Application to polyphonic music generation and transcription. arXiv preprint arXiv:1206.6392, 2012.

S. R. Bowman, L. Vilnis, O. Vinyals, A. M. Dai, R. Jozefowicz, and S. Bengio. Generating sentences from a continuous space. arXiv preprint arXiv:1511.06349, 2015.

Y. Burda, R. Grosse, and R. Salakhutdinov. Importance weighted autoencoders. In *International Conference on Learning Representations*, 2016.

J. Chung, K. Kastner, L. Dinh, K. Goel, A. C. Courville, and Y. Bengio. A recurrent latent variable model for sequential data. In *Advances in neural information processing systems*, pages 2980-2988, 2015.

A. Doucet and A. M. Johansen. A tutorial on particle filtering and smoothing: Fifteen years later. *Handbook of nonlinear filtering*, 12(656-704):3, 2009.

M. Fraccaro, S. K. Sønderby, U. Paquet, and O. Winther. Sequential neural models with stochastic layers. In *Advances in neural information processing systems*, pages 2199-2207, 2016.

A. Graves, A.-r. Mohamed, and G. Hinton. Speech recognition with deep recurrent neural networks. In 2013 *IEEE international conference on acoustics, speech and signal processing*, pages 6645-6649. IEEE, 2013.

D. Ha, A. Dai, and Q. V. Le. Hypernetworks. arXiv preprint arXiv:1609.09106, 2016.

J. He, D. Spokoyny, G. Neubig, and T. Berg-Kirkpatrick. Lagging inference and posterior collapse in variational autoencoders. arXiv preprint arXiv:1901.05534, 2019.

R. Huerta, T. Mosquiero, J. Fonollosa, N. F. Rulkov, and I. Rodriguez-Lujan. Online decorrelation of humidity and temperature in chemical sensors for continuous monitoring. *Chemometrics and Intelligent Laboratory Systems*, 157:169-176, 2016.

I. Higgins, L. Matthey, A. Pal, C. Burgess, X. Glorot, M. Botvinick, S. Mohamed, and A. Lerchner. beta-vae: Learning basic visual concepts with a constrained variational framework. In *International Conference on Learning Representations*, volume 3, 2017.

S. Hochreiter and J. Schmidhuber. Long short-term memory. *Neural computation*, 9(8):1735-1780, 1997.

D. P. Kingma and M. Welling. Auto-encoding variational bayes. arXiv preprint arXiv:1312.6114, 2013.

D. P. Kingma, T. Salimans, R. Jozefowicz, X. Chen, I. Sutskever, and M. Welling. Improved variational inference with inverse autoregressive flow. In *Advances in neural information processing systems*, pages 4743-4751, 2016.

D. Krueger, C.-W. Huang, R. Islam, R. Turner, A. Lacoste, and A. Courville. Bayesian hypernetworks. arXiv preprint arXiv:1710.04759, 2017.

R. Luo, W. Zhang, X. Xu, and J. Wang. A neural stochastic volatility model. In *Thirty-Second AAAI Conference on Artificial Intelligence*, 2018.

C. J. Maddison, J. Lawson, G. Tucker, N. Heess, M. Norouzi, A. Mnih, A. Doucet, and Y. Teh. Filtering variational objectives. In *Advances in Neural Information Processing Systems*, pages 6573-6583, 2017.

D. Rezende and S. Mohamed. Variational inference with normalizing flows. In *International Conference on Machine Learning*, pages 1530-1538, 2015.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for training a variational hyper recurrent neural network (VHRNN), the method comprising:
   for each step in sequential training data:
      determining a prior probability distribution for a latent variable, given previous observations and previous latent variables, from a prior network of the VHRNN using an initial hidden state;
      determining a hidden state from a recurrent neural network (RNN) of the VHRNN using an observation state, the latent variable and the initial hidden state;
      determining an approximate posterior probability distribution for the latent variable, given the observation state, previous observations and previous latent variables, from an encoder network of the VHRNN using the observation state and the initial hidden state;
      determining a generating probability distribution for the observation state, given the latent variable, the previous observations and the previous latent variables, from a decoder network of the VHRNN using the latent variable and the initial hidden state; and
      maximizing a variational lower bound of a marginal log-likelihood of the training data to train the VHRNN; and
   storing the trained VHRNN in a memory,
   wherein the RNN, defined as g, is based on:

$$h_t = g_{\theta(z_t, h_{t-1})}(x_t, z_t, h_{t-1})$$

where t>0, $\theta(z_t, h_{t-1})$ is a hypernetwork of the VHRNN that generates parameters of the RNN g using the latent variable, defined as $z_t$, and the initial hidden state, defined as $h_{t-1}$, $x_t$ is the observation state, and t is an integer and is a current step of the steps in the sequential training data.

2. The method of claim 1, wherein the variational lower bound includes at least one of an evidence lower bound (ELBO), importance weight autoencoders (IWAE), or filtering variational objectives (FIVO).

3. The method of claim 1, wherein the prior probability distribution, defined as $p(z_t|x_{<t}, z_{<t})$, for the latent variable, defined as $z_t$, is based on:

$$z_t|x_{<t}, z_{<t} \sim \mathcal{N}(\mu_t^{prior}, \Sigma_t^{prior})$$

where $(\mu_t^{prior}, \Sigma_t^{prior})$ is the prior network, $x_t$ is the observation state, and t is a current step of the steps in the sequential training data.

4. The method of claim 1, wherein the hypernetwork $\theta(z_t, h_{t-1})$ is implemented as a recurrent neural network (RNN).

5. The method of claim 1, wherein the hypernetwork $\theta(z_t, h_{t-1})$ is implemented as a long short-term memory (LSTM).

6. The method of claim 1, wherein the hypernetwork $\theta(z_t, h_{t-1})$ generates scaling vectors for input weights and recurrent weights of the RNN.

7. The method of claim 1, wherein the generating probability distribution, defined as $p(x_t|z_{\leq t}, x_{<t})$, for the observation state, defined as $x_t$, is based on:

$$x_t|z_{\leq t}, x_{<t} \sim \mathcal{N}(\mu_t^{dec}, \Sigma_t^{dec})$$

where $(\mu_t^{dec}, \Sigma_t^{dec}) = \phi_{\omega(z_t, h_{t-1})}^{dec}(z_t, h_{t-1})$, and $\omega(z_t, h_{t-1})$ is another hypernetwork of the VHRNN that generates parameters of the decoder network, defined as $\phi^{dec}$, using the latent variable, defined as $z_t$, and the initial hidden state, defined as $h_{t-1}$, and t is a current step of the steps in the sequential training data.

8. The method of claim 7, wherein the hypernetwork $\omega(z_t, h_{t-1})$ is implemented as a multilayer perceptron (MLP).

9. A computer-implemented method for generating sequential data using a variational hyper recurrent neural network (VHRNN) trained using the method of claim 1, the method comprising:
   for each step in the sequential data:
      determining a prior probability distribution for a latent variable $z_t$, given previous observations and previous latent variables, from the prior network of the VHRNN using an initial hidden state;
      determining a hidden state from the recurrent neural network (RNN) of the VHRNN using an observation state, the latent variable and the initial hidden state;
      determining a generating probability distribution for the observation state given the latent variable, the previous observations and the previous latent variables, from the decoder network of the VHRNN using the latent variable and the initial hidden state; and
      sampling a generated observation state from the generating probability distribution,
      wherein the RNN, defined as g, is based on:

$$h_t = g_{\theta(z_t, h_{t-1})}(x_t, z_t, h_{t-1})$$

where t>0, $\theta(z_t, h_{t-1})$ is a hypernetwork of the VHRNN that generates parameters of the RNN using the latent variable, defined as $z_t$, and the initial hidden state, defined as $h_{t-1}$, $x_t$ is the observation state, and t is an integer and is a current step of the steps in the sequential data.

10. The method of claim 9, wherein the prior probability distribution, defined as $p(z_t|x_{<t}, z_{<t})$, for the latent variable $z_t$ is based on:

$$z_t|x_{<t}, z_{<t} \sim \mathcal{N}(\mu_t^{prior}, \Sigma_t^{prior})$$

where ($\mu_t^{prior}, \Sigma_t^{prior}$) is the prior network, $x_t$ is the observation state, and t is a current step of the steps in the sequential data.

11. The method of claim 9, wherein the hypernetwork $\theta(z_t, h_{t-1})$ is implemented as a recurrent neural network (RNN).

12. The method of claim 9, wherein the hypernetwork $\theta(z_t, h_{t-1})$ is implemented as a long short-term memory (LSTM).

13. The method of claim 9, wherein the hypernetwork $\theta(z_t, h_{t-1})$ generates scaling vectors for input weights and recurrent weights of the RNN g.

14. The method of claim 9, wherein the generating probability distribution, defined as $p(x_t | z_{\leq t}, x_{<t})$, for the observation state, defined as $x_t$, is based on:

$$x_t | z_{\leq t}, x_{<t} \sim \mathcal{N}(\mu_t^{dec}, \Sigma_t^{dec})$$

where $(\mu_t^{dec}, \Sigma_t^{dec}) = \phi_{\omega(z_t, h_{t-1})}(z_t, h_{t-1})$, and $\omega(z_t, h_{t-1})$ is another hypernetwork of the VHRNN that generates parameters of the decoder network, defined as $\phi^{dec}$, using the latent variable, defined as $z_t$, and the initial hidden state, defined as $h_{t-1}$, and t is a current step of the steps in the sequential data.

15. The method of claim 14, wherein the hypernetwork $\omega(z_t, h_{t-1})$ is implemented as a multilayer perceptron (MLP).

16. The method of claim 9, further comprising forecasting future observations of the sequential data based on the sampled generated observation states.

17. The method of claim 9, wherein the sequential data is time-series financial data.

18. A non-transitory computer readable medium comprising a computer readable memory storing thereon a variational hyper recurrent neural network trained using the method of claim 1, the variational hyper recurrent neural network executable by a computer to perform a method to generate sequential data, the method comprising:

for each step in the sequential data:
determining a prior probability distribution for a latent variable $z_t$, given previous observations and previous latent variables, from the prior network of the VHRNN using an initial hidden state;
determining a hidden state from the recurrent neural network (RNN) of the VHRNN using an observation state, the latent variable and the initial hidden state;
determining a generating probability distribution for the observation state given the latent variable, the previous observations and the previous latent variables, from the decoder network of the VHRNN using the latent variable and the initial hidden state; and
sampling a generated observation state from the generating probability distribution,
wherein the RNN, defined as q, is based on:

$$h_t = g_{\theta(z_t, h_{t-1})}(x_t, z_t, h_{t-1})$$

where for t>0, $\theta(z_t, h_{t-1})$ is a hypernetwork of the VHRNN that generates parameters of the RNN g using the latent variable defined as $z_t$, and the initial hidden state, defined as $h_{t-1}$, $x_t$ is the observation state, and t is an integer and is a current step of the steps in the sequential data.

* * * * *